United States Patent
Ross et al.

(12) 
(10) Patent No.: US 6,279,933 B1
(45) Date of Patent: Aug. 28, 2001

(54) LOCKING MECHANISM FOR MOVABLE SUBFRAME OF SEMI-TRAILERS

(75) Inventors: Joseph M. Ross, North Canton; Marc A. Gibson, New Philadelphia; Timothy V. Hess, Smithville, all of OH (US)

(73) Assignee: The Boler Company., Itasca, IL (US)

(*) Notice: Subject to any disclaimer, the term of this patent is extended or adjusted under 35 U.S.C. 154(b) by 0 days.

(21) Appl. No.: 09/829,690

(22) Filed: Apr. 10, 2001

Related U.S. Application Data

(63) Continuation of application No. 09/234,581, filed on Jan. 21, 1999.

(51) Int. Cl.[7] .................................................. B62D 33/08
(52) U.S. Cl. ................................. 280/149.2; 280/405.1; 280/407.1
(58) Field of Search .......................... 280/149.2, 407.1, 280/405.1

(56) References Cited

U.S. PATENT DOCUMENTS

| | | |
|---|---|---|
| 1,314,498 | 9/1919 | Bower . |
| 2,835,319 | 5/1958 | Fleming, Jr. . |
| 2,844,126 | 7/1958 | Gaylord . |
| 4,286,797 | 9/1981 | Mekosh, Jr. et al. . |
| 4,939,982 | 7/1990 | Immega et al. . |
| 5,137,296 | 8/1992 | Forman . |
| 5,199,732 | 4/1993 | Lands et al. . |
| 5,218,280 | 6/1993 | Edwards . |
| 5,314,201 | 5/1994 | Wessels . |
| 5,346,233 | 9/1994 | Moser . |
| 5,480,181 | 1/1996 | Bark et al. . |
| 5,509,687 | 4/1996 | Thorndike . |
| 5,564,727 | 10/1996 | Wessels . |
| 5,620,195 | 4/1997 | Wessels . |
| 5,642,896 | 7/1997 | Pierce et al. . |
| 5,758,890 | 6/1998 | Wessels . |
| 5,833,253 | 11/1998 | Hess . |
| 6,213,489 | * 4/2001 | Eckelberry .................. 280/407.1 |

FOREIGN PATENT DOCUMENTS 2137940   10/1984   (GB) .

* cited by examiner

*Primary Examiner*—Kenneth R. Rice
*Assistant Examiner*—Michael Cuff
(74) *Attorney, Agent, or Firm*—Buckingham, Doolittle & Burroughs, LLP; David P. Dureska, Esq.

(57) ABSTRACT

A locking mechanism for a movable subframe of a semi-trailer includes at least a pair of transversely spaced pins. Each pin is extendable into and retractable from an opening formed in its respective longitudinally extending main member of the subframe and a selected aligned one of a plurality of openings formed in its respective longitudinally extending rail of the trailer main frame. An elastomeric bladder is disposed between the pins and is operatively connected to one or more cables and/or linkage members which in turn are operatively connected to the pins. When the bladder is voided of air and is in its collapsed state, sufficient slack exists in the bladder, cables and/or linkage members to enable the bias force of a coil spring disposed about each of the pins to independently cause the pins to extend through their respective aligned openings to lock the subframe in a selected longitudinal position with respect to the trailer main frame. When air is introduced into the bladder, it distends or elongates and in turn shortens the length of the portions of the bladder, cables and/or linkage members which are in transverse alignment with the pins, to impart a linear retraction force on the pins which overcomes the bias force of the springs to independently retract each of the pins from its respective main frame opening enabling repositioning of the subframe beneath the trailer frame. The subframe is free of additional structure for bearing reactive forces generated during normal operation of the locking mechanism.

20 Claims, 14 Drawing Sheets

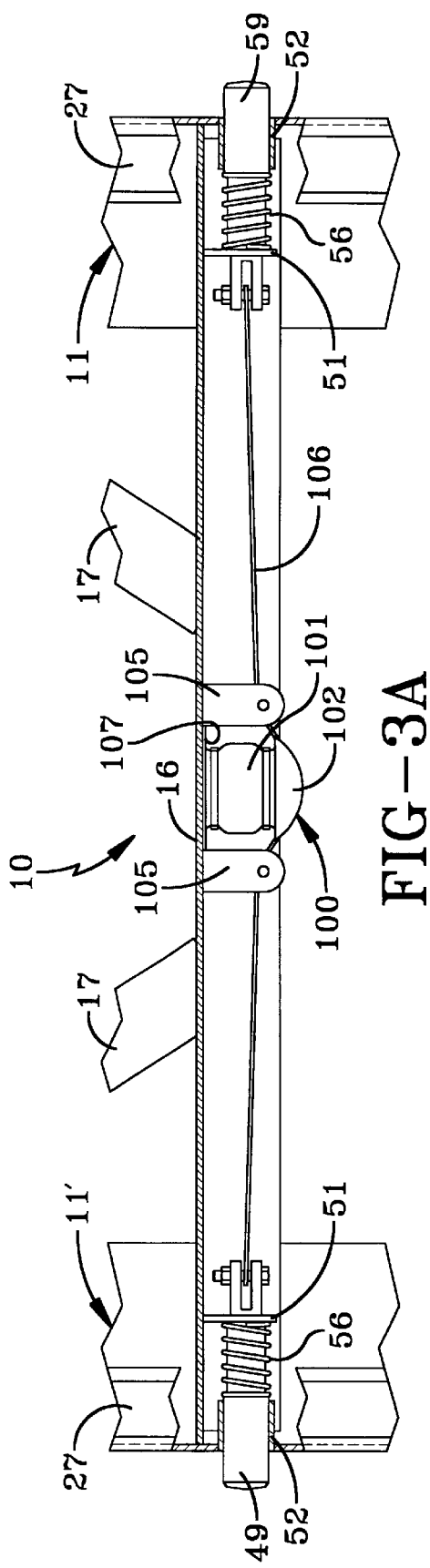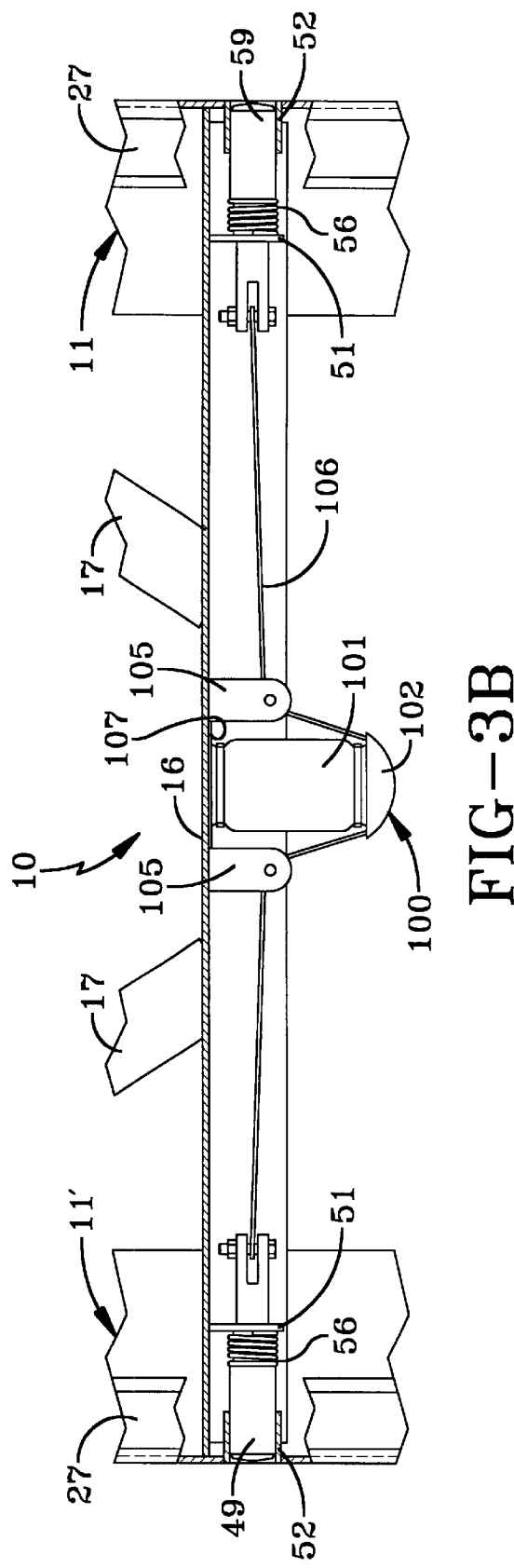

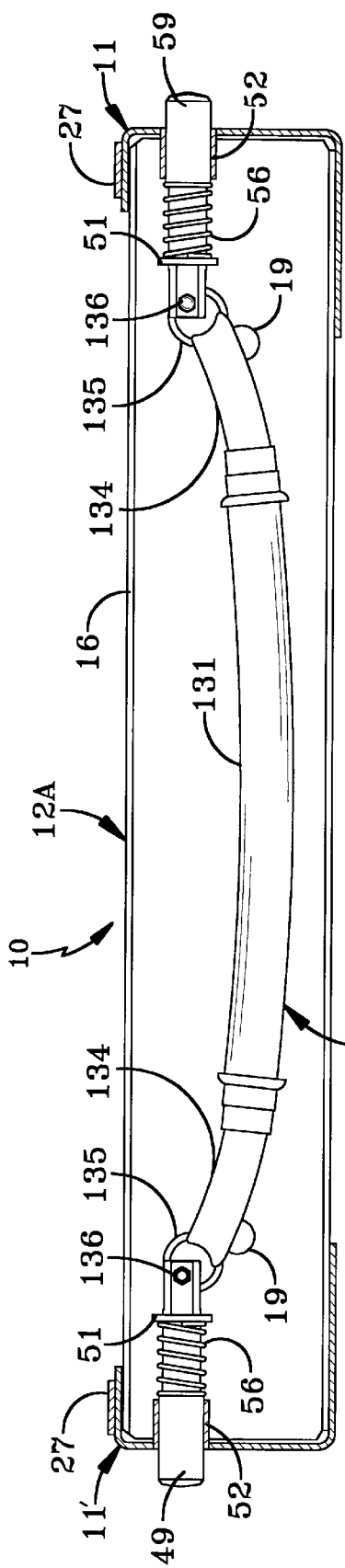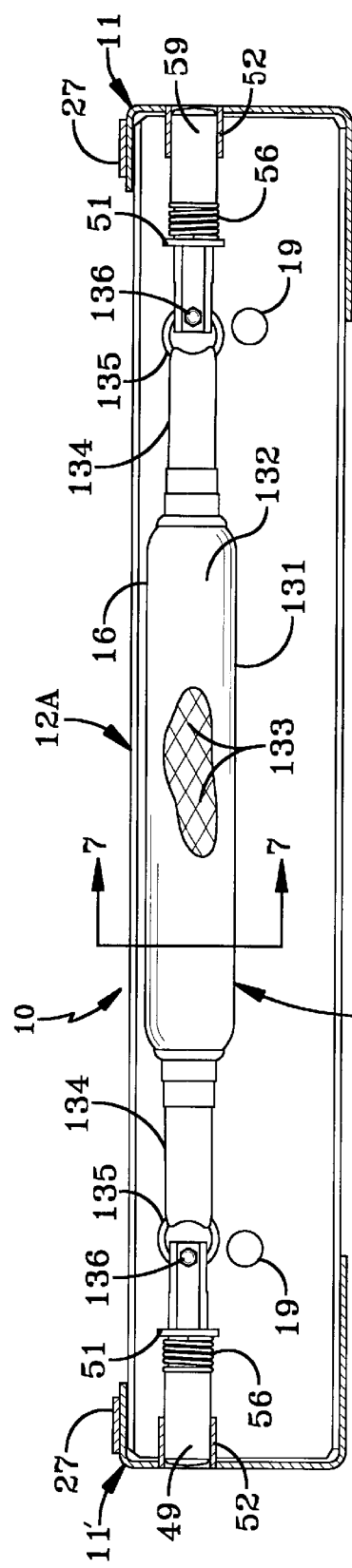

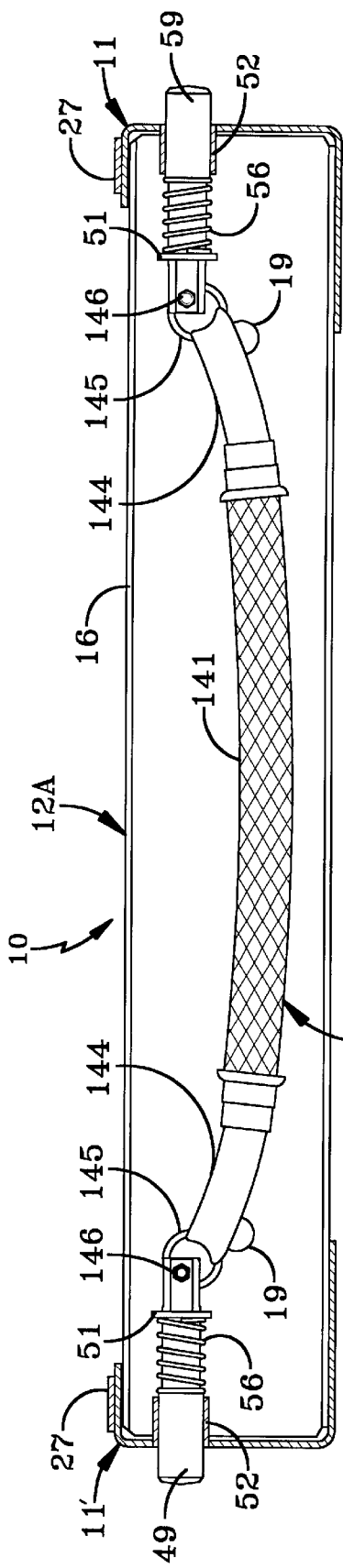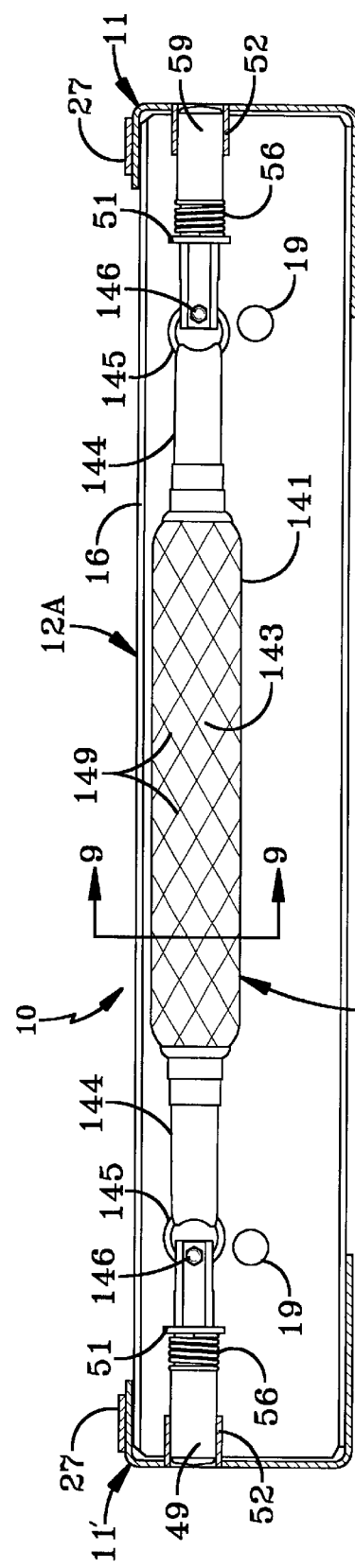
FIG-8A
FIG-8B

LOCKING MECHANISM FOR MOVABLE SUBFRAME OF SEMI-TRAILERS

CROSS-REFERENCE

This is a Continuation of Application Ser. No. 09/234,581, filed Jan. 21, 1999.

BACKGROUND OF THE INVENTION

1. Field of the Invention

The invention relates to semi-trailer subframes, and in particular to movable subframes for semi-trailers. More particularly, the invention is directed to a pin retraction mechanism of a semi-trailer movable subframe for locking the movable subframe in a selected position relative to the semi-trailer main frame, wherein each one of at least one pair of pins is individually retractable by a single mechanism to an unlocked position for moving the subframe to a selected position beneath the semi-trailer main frame, and further wherein each one of the pins is individually extendable to the locking position.

2. Background Art

Movable subframes, typically referred to as sliders, have been utilized on tractor-trailers or semi-trailers for many years. One or more axle/suspension systems usually are suspended from a single slider structure. The slider in turn is mounted on the underside of the trailer main frame, and is movable longitudinally therealong to provide a means of variable load distribution. More specifically, the amount of cargo that a trailer may carry is governed by local, state and/or national road and bridge laws, and is dependent on proper load distribution. The basic principle behind most road and bridge laws is to limit the maximum load that a vehicle may carry, as well as to limit the maximum load that can be supported by individual axles. A trailer having a slider gains an advantage with respect to laws governing maximum axle loads. More particularly, proper placement of the slider varies individual axle loads or redistributes the trailer load so that it is within legal limits.

Once properly positioned, the slider is locked in place on the underside of the trailer by a retractable pin mechanism. The retractable pin mechanism generally includes two or more, and typically four, pins which conventionally are interconnected by a manual, electric, pneumatic, or hydraulic actuated crank mechanism. When the pins are in their extended or outboardmost position, they each extend through a respective opening formed in the slider and a selected aligned one of a plurality of openings formed in the trailer main frame. The pins thereby lock the slider in a selected position relative to the trailer main frame.

However, these pins can become jammed. The mechanical advantage enjoyed by a manual operator of the pin mechanism is designed to overcome spring forces which bias the pins to the extended locked position, for retracting and unlocking the pins when it becomes necessary to reposition the slider. This mechanical advantage is not designed to free or retract jammed pins from their locked position. Since the mechanical advantage is sometimes inadequate, prior art slider pin mechanisms rely on either the brute force of the semi-trailer operator or add-on devices such as fluid, electric or stored-energy actuated systems designed to release jammed pins.

More specifically, the reason for jammed pins is that shear forces are imposed on the individual pins. The shear forces operate in the direction of the longitudinal axis of each cylindrical pin. More particularly, slight movement of the slider relative to the trailer main frame during operation of the semi-trailer can cause slight misalignment between the respective slider and trailer main frame openings through which each pin extends when in the locked position. This misalignment can in turn cause contact pressure points between each pin and its respective trailer main frame opening, aligned slider opening, and mounting bracket opening adjacent to the inboard end of the pin. These contact pressure points in turn cause the above-mentioned shear forces on the pins. Such whipsaw-like or jamming forces can become greater than the force that a semi-trailer operator can manually apply through a conventional crank mechanism to free the pins.

Thus, when prior art locking pin mechanisms become jammed, the operator of the semi-trailer risks personal injury due to overexertion in attempting to manually free jammed pins, and further risks damaging the retractable pin mechanism. Specifically, a typical method of attempting to release prior art jammed pin mechanisms is for the semi-trailer operator to rock the trailer fore and aft, while an assistant manually operates the retractable pin mechanism. The rocking motion briefly realigns the misaligned openings, so that the assistant can retract the pins during the period of realignment. The process has been simplified by various prior art assisted-release devices such as fluid, electric and stored-energy assisted-release devices, which generally allow the vehicle operator to maneuver the trailer while the quick release device automatically frees the jammed pins, thus effectively obviating the need for another person to manually operate the crank mechanism.

However, such devices, whether of the electric, fluid, stored-energy or typical manual type, usually are complicated assemblies which apply retraction force to the pins in an indirect or non-linear fashion through a usually complex assembly of parts such as shafts, levers, arms, and the like. For example, stored-energy type devices can include complicated spring assemblies, and electric devices can include components such as a solenoid. While such systems can operate satisfactorily for their intended purpose, they can suffer from several disadvantages. First, such complex assemblies utilize a relatively large number of parts which are more subject to wear and possible downtime than is a more simple retractable pin mechanism. In addition, increased complexity usually leads to increased weight, which is undesirable in the semi-trailer industry because it decreases the profit that the owner of a semi-trailer can realize by reducing the amount of cargo that can be hauled, as discussed hereinabove in relation to road and bridge laws. Also, such increased complexity also adds cost to the manufactured semi-trailer. Finally, during operation, and especially with respect to the locked or extended pin position, due to the complex interconnected nature of such mechanisms, which typically utilize a single actuator, if one pin fails to engage or lock, it follows that none of the pins can lock and the semi-trailer thus is inoperable until the condition is corrected. Moreover, if one pin accidentally disengages during operation of the semi-trailer, then all of the pins, usually four, must disengage, which can lead to dangerous consequences for the affected semi-trailer as well as for other vehicles operating in its vicinity. Another disadvantage of such assemblies is that various structural components of the slider must serve as a bearing surface for absorbing unbalanced reactive forces that occur during operation of such prior art locking pin mechanisms and for maintaining proper relative positioning of the various components of the mechanism for its reliable operation. Such positioning is important because the mechanism is sensitive to relatively small changes in timing or adjustment, and the entire assembly and supporting slider structure on which the mechanism is installed are tolerance sensitive. However, in order to make the slider structural components robust enough to withstand such reactive forces, additional structural components often must be added to the slider and/or existing structure must be made more sturdy. Unfortunately, such required changes to the slider structure typically result in unwanted added cost, weight and complexity.

Other prior art locking pin mechanisms solve certain ones of the above-described problems by implementing direct linear actuation of each pin by a separate, usually pneumatically, hydraulically or electrically operated actuator. While such a system solves the above-described problem of all or nothing locking and unlocking of the pin retraction mechanism, it fails to solve the problems of complexity, weight and cost, since such locking pin mechanisms require four, albeit independently operable, actuation mechanisms.

The present invention solves the above-described problems by providing a locking pin mechanism for a movable subframe of semi-trailers which is relatively inexpensive to manufacture and install, durable and reliable in use, simple and lightweight, relatively insensitive to tolerances, adjustment or timing, and which provides for individual locking and unlocking of each pin of the mechanism without or with minimal forces exerted on the supporting structure of the slider.

SUMMARY OF INVENTION

Objectives of the present invention include providing a locking mechanism for a movable subframe of semi-trailers which provides for individual locking and unlocking of each pin of the mechanism, thereby enabling locking of the subframe relative to the trailer main frame even if only one pin is operable, and further preventing unlocking of the subframe from a selected position relative to the trailer main frame if one or more, but less than all, of the pins accidentally retract.

Another objective of the present invention is to provide such an improved locking mechanism for a movable subframe of semi-trailers, whereby the pins of the mechanism can be retracted from a locked position by a single operator with limited physical exertion, whether the pins are in a normal locked position or jammed in the locked position.

A still further objective of the present invention is to provide such an improved locking mechanism for a movable subframe of semi-trailers, which is economical, relatively simple and lightweight, durable, and reliable in use.

Still another objective of the present invention is to provide such an improved locking mechanism for a movable subframe of semi-trailers, which operates completely without or with little exertion of force on the supporting structure of the slider, and which is relatively free of sensitivities to tolerances, adjustments or timing.

These objectives and advantages are obtained by the locking mechanism for a movable subframe of a vehicle, the general nature of which may be stated as including, at least a pair of transversely spaced locking pins movably mounted on the subframe, each of the locking pins being mounted adjacent to an opening formed in a respective one of a pair of spaced apart, longitudinally extending main members of the subframe, the subframe being free of additional structure and reinforcement for bearing reactive forces generated during normal operation of the locking mechanism; and a linkage operatively connected to the locking pins, the linkage including a length reducing member for shortening a transverse length of the linkage and imparting a retraction force on the pins to enable each of the pins to overcome an opposite bias force of a coil disposed adjacent to and acting on the pin, thereby independently retracting each of the pins from a selected aligned one of a plurality of openings formed in a respective one of a pair of spaced apart, longitudinally extending rails of a main frame of the vehicle, to enable longitudinal repositioning of the subframe beneath the vehicle main frame, the length reducing member further enabling lengthening of the transverse length of the linkage so that the bias force of each of the springs independently urges its respective pin through the aligned openings to lock the subframe relative to the main frame.

BRIEF DESCRIPTION OF THE DRAWINGS

The preferred embodiments of the invention, illustrative of the best mode in which applicants have contemplated applying the principles, is set forth in the following description and is shown in the drawings and is particularly and distinctly pointed out and set forth in the appended claims.

FIG. 3A is a reduced-size top view of the slider and first embodiment locking pin mechanism of FIG. 2, with hidden parts represented by broken lines, showing the pins in an extended or locked position;

FIG. 3B is a view similar to FIG. 3A, but showing the pins in a retracted or unlocked position;

FIG. 6A is a view similar to FIG. 5A, but showing a third embodiment of the locking pin mechanism of the present invention installed on the semi-trailer slider, and further showing the pins in an extended or locked position;

FIG. 6B is a view similar to FIG. 6A, but with portions broken away and showing the pins in a retracted or unlocked position;

FIG. 8A is a view similar to FIGS. 5A and 6A, but showing a fourth embodiment of the locking pin mechanism of the present invention installed on the slider, and further showing the pins in an extended or locked position;

FIG. 8B is a view similar to FIG. 8A, but showing the pins in a retracted or unlocked position;

DESCRIPTION OF THE PREFERRED EMBODIMENT

Figure 1:
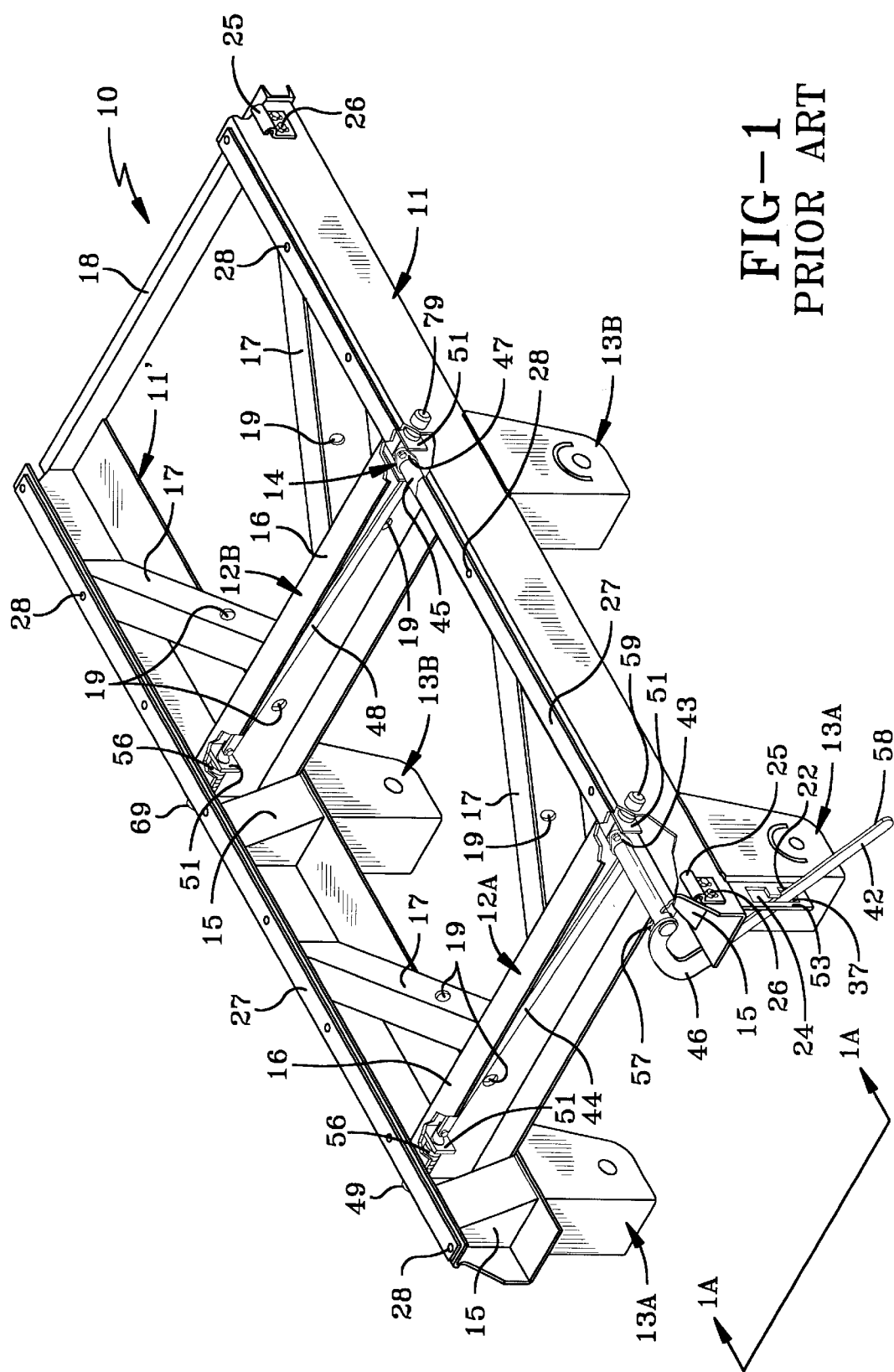
FIG. 1 is a perspective view, with portions broken away, of a movable slider for semi-trailers showing a prior art locking pin mechanism installed on the semi-trailer slider.
Figure 1A:
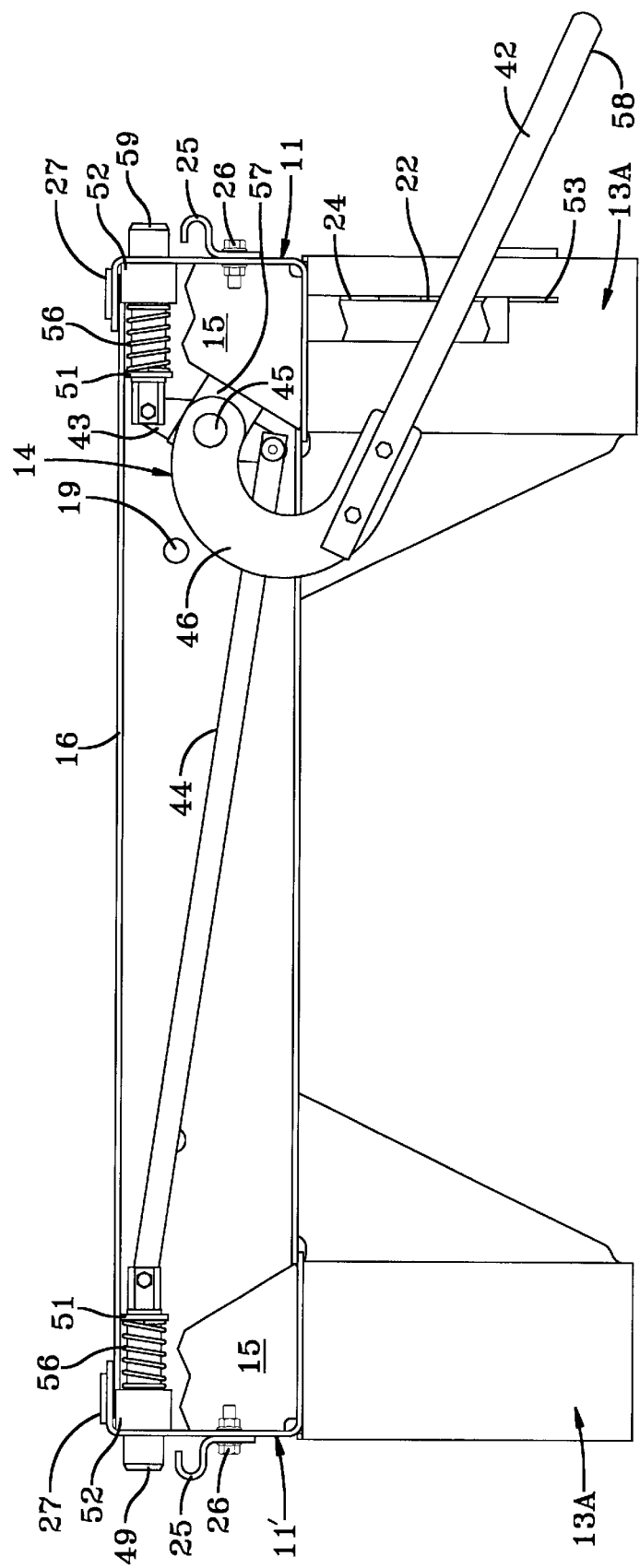
FIG. 1A is an enlarged view, with portions broken away, looking in the direction of lines 1A—1A of FIG. 1, showing the front pins and associated components of the prior art locking pin mechanism.

So that the environment in which the embodiments of the present invention operate, as well as the present invention itself, both can be better understood, a slider or subframe of a semi-trailer incorporating a prior art manually actuated retractable locking pin mechanism is indicated generally at 10 and is shown in FIG. 1. Slider 10 includes a pair of main members 11, 11', front and rear generally K-shaped cross member structures 12A and 12B, respectively, front and rear pairs of hangers 13A and 13B, respectively, for suspending axle/suspension systems (not shown), and the prior art manually operable retractable locking pin mechanism 14. It is understood that the present invention can be utilized on other types of slider configurations, such of those having cross member structures which all are perpendicular to the main members, without affecting its overall concept.

Specifically, each main member 11, 11' is an elongated, generally C-shaped beam made of a metal such as steel or other suitable material. The open portion of each main member 11, 11' is opposed to the open portion of the other main member and faces inboard relative to slider 10. Main members 11, 11' are connected to each other in spaced apart parallel relationship by K-shaped cross member structures 12A, B.

Each K-shaped cross member structure 12 includes a base member 16 which extends between and is perpendicular to main members 11, 11'. Each base member 16 is a generally C-shaped beam made of a metal such as steel or other suitable material. The open portion of each base member 16 faces in a frontward direction. Each end of base member 16 nests in the open portion of a respective one of main members 11, 11', and is secured therein by any suitable means such as welding or mechanical fastening. Each front hanger 13A is attached, by welding or other suitable means, to the lowermost surface of a respective one of main members 11, 11' at a location directly beneath base member 16 of front K-shaped cross member structure 12A. Each rear hanger 13B similarly is attached at a location directly beneath base member 16 of rear K-shaped cross member structure 12B. Each K-shaped cross member structure 12 further includes a pair of inclined members 17, each of which is a generally C-shaped beam also made of a metal such as steel or other suitable material. The open portion of each inclined member 17 faces in an outboard-frontward direction, and each of the inclined members extends between generally the middle portion of base member 16 and a respective one of main members 11, 11'. The front end of each inclined member 17 is attached at an angle to the rearwardmost surface of base member 16 by any suitable means such as welding or mechanical fastening, and the rear end of each of the inclined members is nested at an angle in the open portion of a respective one of main members 11, 11', and also is attached thereto in any suitable manner such as by welding or mechanical fastening. An optional reinforcement bar 18, which extends between and perpendicular to the rearwardmost ends of main members 11, 11', adds additional strength to the structure, and is attached thereto by any suitable means such as welding or mechanical fastening. Thus, it can be seen that base member 16 and inclined members 17 form an integral K-shaped cross member structure 12 which interconnects and maintains main members 11, 11' in a spaced apart parallel relationship. A reinforcement box 15 is mounted by any suitable means in the open portion of each main member 11, 11' frontward of and adjacent to each end of each of base members 16, to provide additional strength to slider 10 for supporting hangers 13A, B, and their associated suspension assemblies.

One or more openings 19 are formed in the vertically extending surface of each base member 16 and each inclined member 17, and each of the openings is aligned with certain ones of the openings formed in the other members to provide for passage of air and/or fluid conduits, electrical lines, and the like, used in the operation of the semi-trailer (not shown).

Each main member 11, 11' has a pair of rail guides 25 mounted on its outboard surface by bolts 26. Each rail guide 25 is mounted adjacent to a respective one of the ends of main members 11, 11'. A low friction strip 27 is attached to the uppermost surface of each main member 11, 11' by recessed fasteners 28, and extends generally the entire length of the main member. Strip 27 is formed of any suitable low-friction material, such as ultra-high molecular weight polyethylene.

Slider or subframe 10 is movably mounted on a main frame (not shown) of a trailer by slidable engagement of rail guides 25 with spaced-apart, parallel rails (not shown) which are mounted on and depend from the underside of the trailer main frame. Each low friction strip 27 abuts a respective one of the rails to provide a smooth, generally low friction contact surface for slidable movement of slider 10 on the trailer main frame.

Slider 10 thus can be selectively positioned relative to the trailer main frame for optimum load distribution by prior art retractable locking pin mechanism 14. The components of pin mechanism 14, unless otherwise noted, are formed of a sturdy metal such as steel or the like. Pin mechanism 14 includes an elongated pivot rod 45 which passes rearwardly through an aligned pair of openings (not shown) formed in base member 16 and a predetermined one of inclined members 17 of front K-shaped cross member 12A adjacent to main member 11. A lever 43 is attached, by welding or other suitable means, to pivot rod 45 adjacent to the front end of the rod and frontwardly adjacent to base member 16 of front K-shaped cross member 12A. A first end of an elongated arm 44 is pivotally attached by any suitable means to a lower end of lever 43. A second end of arm 44 is pivotally attached by any suitable means to the inboard end of a pin 49 disposed adjacent to opposite main member 11'. An upper end of lever 43 is pivotally attached by any suitable means to the inboard end of a pin 59 disposed adjacent to main member 11. A lever 47 similarly is attached to pivot rod 45 adjacent to the rear end of the rod and frontwardly adjacent to base member 16 of rear K-shaped cross member 12B. A first end of an elongated arm 48 is pivotally attached to a lower end of lever 47. A second end of arm 48 is pivotally attached to the inboard end of a pin 69 disposed adjacent to opposite main member 11'. An upper end of lever 47 is pivotally attached to the inboard end of a pin 79 disposed adjacent to main member 11.

The inboard end of each pin 49, 59, 69, 79 is slidably mounted in an opening (not shown) formed in a bracket 51 which is attached by suitable means such as welding to a respective one of base members 16. An enlarged outboard end of each pin 49, 59, 69, 79 passes through an opening (not shown) formed in a respective one of main members 11, 11'.

The above-described arrangement of prior art parts including levers 43, 47, elongated arms 44, 48, pivot rod 45, and pins 49, 59, 69, 79, is actuated by a manually operated handle assembly 58. Handle assembly 58 includes an elongated handle 42 and a generally C-shaped arm 46 attached to the inboard end of the handle. Handle 42 is mounted on generally C-shaped outboard-facing arm 46 by any suitable means. An outboard end of handle 42 extends outboardly away from main member 11 through a vertically disposed travel slot 37 formed in a rectangular-shaped plate 53, which is attached by any suitable means such as welds to a front surface of hanger 13A and the bottom surface of main member 11 from which the hanger depends. Vertically disposed travel slot 37 includes rearwardly offset discrete lower and upper cutouts or detents 22 and 24, respectively, which are formed in plate 53 and communicate with the travel slot. The outboardly extending disposition of handle 42 enables easy grasping of the handle to operate retractable pin mechanism 14, which operation will be described in detail hereinbelow. An upper end of C-shaped arm 46 is immovably mounted, such as by welding, on the front end of pivot rod 45. A pivot rod support 57 is attached to reinforcement box 15 adjacent to the front end of pivot rod 45, to prevent excessive inboard, outboard or vertical movement of the pivot rod. Such prevention of excessive movement of pivot rod 45 is important because, as will be appreciated from the description of the operation of prior art locking pin mechanism 14 set forth immediately below, the locking pin mechanism is sensitive to tolerances, adjustment and timing.

When it is desired to lock slider 10 in a selected position relative to the trailer main frame, the main member openings are aligned with selected ones of a plurality of correspondingly-sized openings formed in the rails of the trailer main frame (not shown). Each pin 49, 59, 69, 79 automatically extends through its respective selected aligned openings of the main member and the trailer frame rail since the pin is biased in an outboard direction by a coil spring 56 captured between bracket 51 and the enlarged outboard end of the pin and a pin guide cylinder 52. Each pin guide cylinder 52 is mounted, such as by welds, on a respective one of main members 11, 11' in alignment with a respective one of the main member openings. When it is again desired by the operator of the semi-trailer to move slider 10 beneath the trailer main frame using prior art locking mechanism 14, the parking brake of the trailer is engaged, and handle 42 is disengaged from lower detent 22 by manually applying frontward pressure to the outboard end of the handle to move the handle horizontally out of the lower detent and frontwardly into travel slot 37. Handle 42 then is pulled vertically upwardly within slot 37 to upper detent 24 in a single continuous motion. Such movement of handle 42 to its upwardmost position in travel slot 37 causes counterclockwise rotation of pivot rod 45, thereby overcoming the bias force of coil springs 56 and retracting pins 49, 59, 69, 79 to an unlocked position. It should be noted that such movement of components of prior art locking mechanisms 14 results in reactive forces bearing on certain components of slider 10, such as base member 16 and inclined member 17 through which pivot rod 45 passes. Add-on components to slider 10, such as pivot rod support 57, assist in bearing such forces. Slider 10 must bear such reactive forces to maintain proper positioning of the components of locking mechanism 14, which is sensitive to tolerances, adjustment and timing, to ensure the smooth and reliable simultaneous operation of pins 49, 59, 69 and 79. After slider 10 has been selectively repositioned by moving the slider longitudinally along the trailer frame rails until the main member openings align with selected rail openings as described hereinabove for maximizing load distribution, handle 42 can be returned to lower detent 22 thereby causing rotation of pivot rod 45 in a clockwise direction and enabling the bias force of coil springs 56 to urge pins 49, 59, 69, 79, in an outboard direction and into their respective aligned openings to the extended locked position. It should be understood that manually operable pin mechanism 14 is an example of only one type of retractable locking pin mechanism in which all four of the pins lock or unlock at the same time. For example, other prior art pin retraction mechanisms utilize a push-pull handle assembly rather than the vertically moving handle described above. It should be further understood that locking pin mechanism 14 and similar locking pin mechanisms could easily be adapted to be pneumatically, hydraulically or electrically operated. Moreover, some prior art fluid operated locking pin mechanisms are constructed so that each pin is individually locked and unlocked by a separate fluid actuator mechanism, thereby eliminating the interconnecting linkages of locking pin mechanism 14 shown in FIG. 1.

Figure 2:
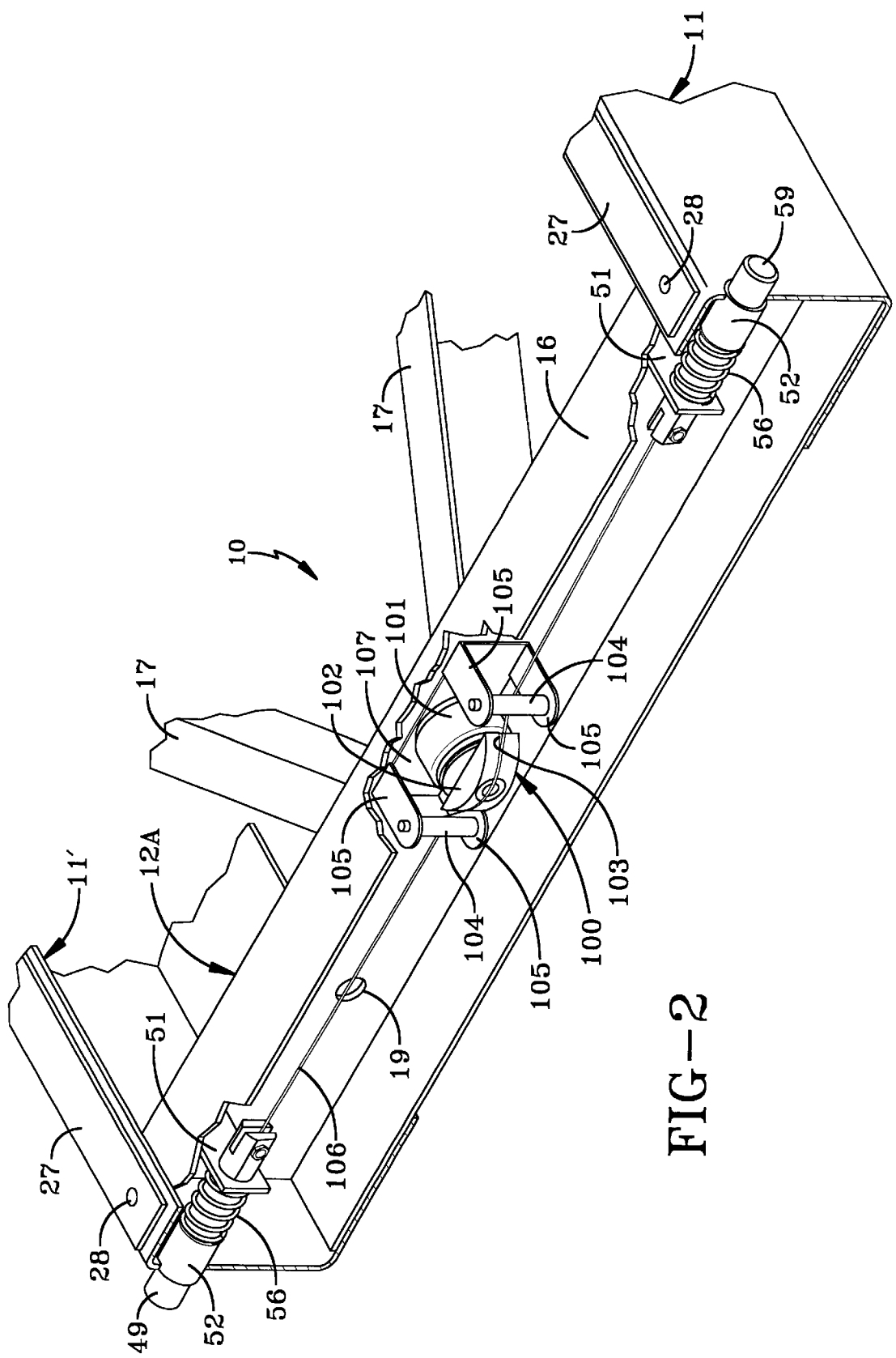
FIG. 2 is a fragmentary perspective view, with portions broken away and in section, of a semi-trailer slider, showing a first embodiment of the locking pin mechanism of the present invention installed on the slider.

A first embodiment of the locking pin mechanism of the present invention is indicated generally at 100 and is shown in FIG. 2. It is understood that locking pin mechanism 100 only is capable of independently controlling two locking pins and thus is shown controlling front pins 49 and 59, with it being further understood that a separate mechanism 100 independently controls rear locking pins 69, 79. However, inasmuch as both mechanisms 100 are identical in structure and operation, only the front locking pin mechanism will be described hereinbelow. Moreover, it should be noted that slider 10 could operate satisfactorily utilizing only a single pair of locking pins, although four locking pins have become the industry standard on most semi-trailers. An air actuator 101 is mounted by suitable means, such as a bolt or the like, on a front surface of the vertically extending web of base member 16 of slider front cross member structure 12A. Air actuator 101 is a conventional air actuator of the type which has many uses in semi-trailers. Air actuator 101 extends longitudinally with respect to slider 10, and preferably is connected to the air reservoir of the semi-trailer brake system by a conduit (not shown). A generally semicircular shaped guide block 102 is immovably mounted on the front end of air actuator 101 by any suitable means, such as a bolt or the like. Guide block 102 is formed with a transversely extending channel 103. A vertically extending capstan 104 preferably is fixedly mounted on a pair of vertically spaced frontwardly extending ears 105, outboardly from and adjacent to each side of guide block 102. Each ear 105 is formed integrally with a transversely extending base plate 107 which is disposed and captured between air actuator 101 and the vertically extending web of base member 16. The integrated structure of ears 105 and base plate 107 aids in the ease of assembly of locking pin mechanism 100, by eliminating the need to individually locate and mount each ear 105 on slider 10. In accordance with an important feature of the first embodiment of the present invention, a cable 106, formed of any suitable material such as aircraft cable, extends between and is attached by any suitable means to the inboard end of each pin 49, 59. It can be appreciated by viewing FIGS. 2, 3A and 3B, that cable 106 is maintained in proper alignment relative to pins 49, 59 by capstans 104, and is operatively connected to air actuator 101 by its disposition in guide block channel 103.

First embodiment locking pin mechanism 100 of the present invention operates in the following manner. As shown in FIGS. 2 and 3A, when air is exhausted from air actuator 101 the actuator is in its normal or collapsed position. It is understood that air is introduced into and exhausted from actuator 101, preferably either by an electronic switch located in the cab of the semi-trailer which in turn opens and closes a pilot valve located in the conduit between the air reservoir and the actuator, or by a manually actuated hand valve located on the trailer itself and in the conduit between the reservoir and the actuator (not shown). The effective transverse length of cable 106 is greatest when air actuator 101 is in the collapsed state, and so provides slack for coil springs 56 of pins 49, 59 to automatically bias the pins outboardly and through their respective openings in main members 11, 11', and into the selected aligned openings formed in the trailer frame rails to lock slider 10 in a selected longitudinal position relative to the trailer main frame. When it is desired by the operator of the semi-trailer to reposition slider 10 beneath the trailer main frame, the pilot valve switch or hand valve is actuated to open the selected valve and air from the air reservoir (not shown) fills aid actuator 101 and elongates the actuator in a frontward direction, which in turn shortens the transverse length of cable 106 by displacing a portion of the cable in a frontward direction (FIG. 3B). This frontward displacement of cable 106 overcomes the bias force of springs 56 to linearly retract pins 49, 59 from the trailer frame rail aligned openings. By maintaining linear alignment of the transversely extending portions of cable 106 with pins 49, 59, capstans 104 provide for direct linear retraction of the pins. With pins 49, 59 in the retracted state, slider 10 can be longitudinally repositioned. After slider 10 has been selectively repositioned, the pilot valve switch or hand valve can again be actuated to close the selected valve and exhaust air from actuator 101, whereby transverse slack is added to cable 106, and pins 49,59 extend to the locked position due to the outboard bias of coil springs 56, as shown in FIGS. 2 and 3A.

It can thus be appreciated, in accordance with one of the main features of the present invention, that minimal reactive forces are imposed on slider 10 during normal operation of locking pin mechanism 100, other than those imposed on brackets 51 by coil springs 56 or those imposed on the opposite bracket 51 by a jammed pin 49, 59. More specifically, only the vertically extending web of base member 16 bears a reactive force in a rearward direction when air actuator 101 elongates in a frontward direction to retract pins 49, 59, but the web is free of special brackets or reinforcement to bear such force. Moreover, it can be seen that locking pin mechanism 100 requires little or no adjustment or timing, and is relatively tolerance insensitive, so long as the travel of actuator 101 is long enough to retract and extend pins 49, 59.

In accordance with another of the main features of the present invention, it should be understood that when air actuator 101 is in a collapsed position, each pin is capable of independently moving to the extended or locked position. More specifically, even if one pin of the pair of pins 49, 59 is prevented from moving, by an obstruction or the like, to the locked position under the force of coil spring 56, the other pin still can move to the locked position if it is unobstructed due to self-adjustment of mechanism 100, and the semi-trailer then can be operated over the road. Moreover, it should further be understood that when air actuator 101 moves from the collapsed to the elongated position shown in FIG. 3B, that even if one pin is obstructed or otherwise prevented from retracting due to jamming or the like, and the force of the air actuator is incapable of overcoming the obstructing force, the other unobstructed pin still can independently retract, again due to the self-adjustment of mechanism 100. This is important to note because accidental retraction of one of pins 49, 59 other than by the force of air actuator 101, such as by an accidental frontward pulling force placed on one end of cable 106, will not necessarily result in retraction of the other pin. This is a critical feature of first embodiment locking pin mechanism 100, because unlike prior art interconnected locking pin mechanisms, accidental retraction of one pin does not necessarily mean retraction of all pins, which could result in undesirable consequences for the affected semi-trailer and other vehicles operating in its vicinity. It is understood that as an added feature, the pilot valve or the hand valve can be integrated with the parking brake of the semi-trailer in a manner well known to the art and to the literature, whereby the valves are operational only when the parking brake is engaged. It should be noted that jammed pins can be freed by a single operator of locking pin mechanism 100 by rocking the trailer and actuating the pin mechanism to automatically free the jammed pin or pins, as described hereinabove for prior art assisted-release pin locking mechanisms. It is also contemplated that first embodiment locking pin mechanism 100 of the present invention could be hydraulically, electrically or even manually actuated without affecting the overall concept of the invention.

Figure 4:
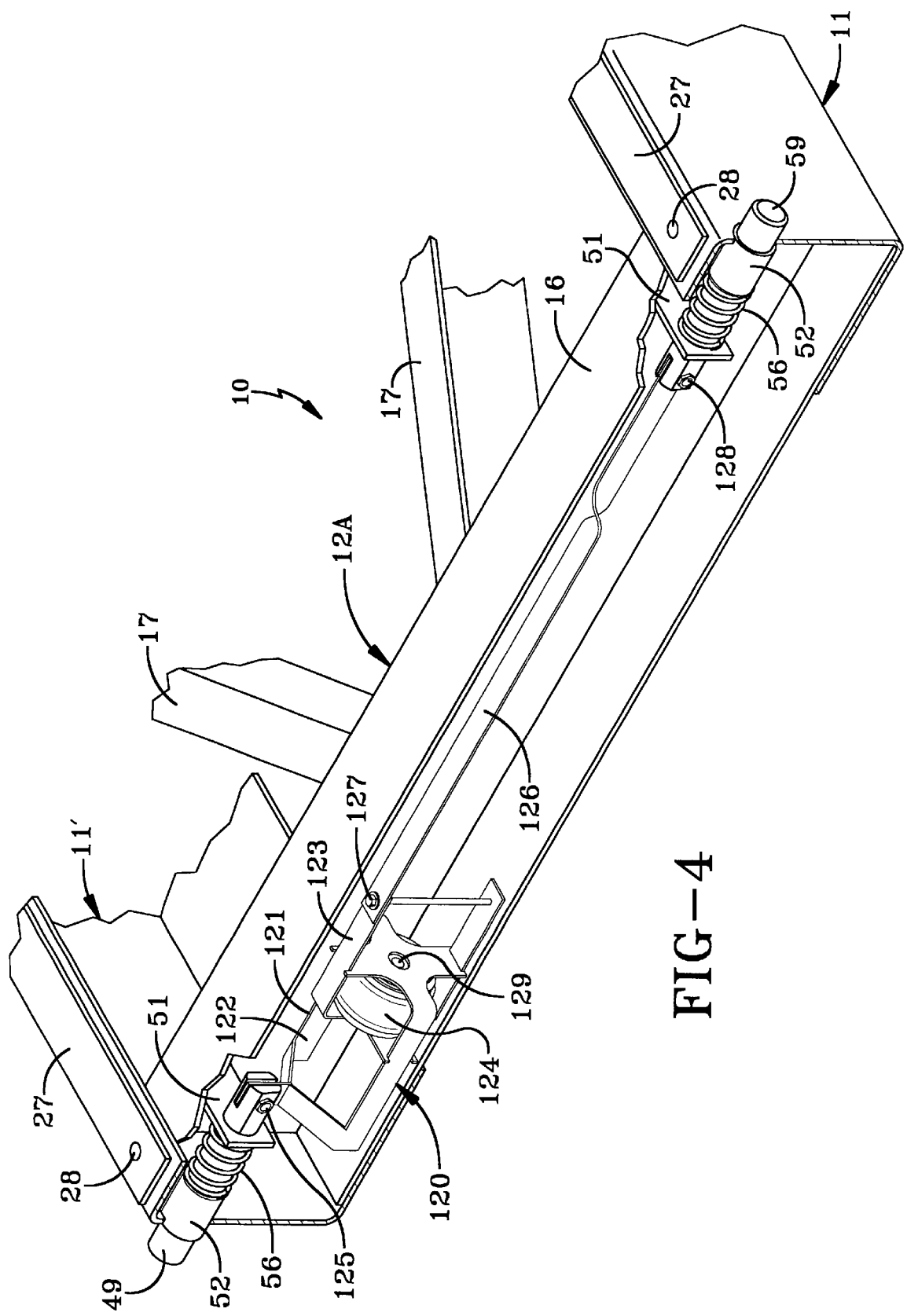
FIG. 4 is a view similar to FIG. 2, but showing a second embodiment of the locking pin mechanism of the present invention installed on the semi-trailer slider.

A second embodiment of the locking pin mechanism of the present invention is indicated generally at 120 and is shown in FIG. 4. As with first embodiment locking pin mechanism 100, second embodiment locking pin mechanism 120 only is capable of independently controlling two locking pins and thus is shown controlling front pins 49, 59, with it being understood that a separate mechanism 120 independently controls rear locking pins 69, 79. However, inasmuch as both mechanisms are identical in structure and operation, only the front locking pin mechanism will be described immediately below. A cage 121, formed of any suitable sturdy material such as steel, comprises a base member 122 which is immovably mounted on the inboard end of pin 49 by a bolt 125, and a sliding member 123 which is slidably engaged with base member 122. An air actuator 124, of the same type that is useful in first embodiment 100 of the present invention, is mounted within cage 121 and is oriented transversely with respect to slider 10. The inboard end of air actuator 124 is attached to the outboard surface of the inboard end of base member 122 by a fastener 129, and the outboard end of the air actuator is attached to the inboard surface of the outboard end of sliding member 123 by a fastener (not shown). Thus, air actuator 124 is captured between sliding member 123 and base member 122. An extension arm 126 is attached at its inboard end to the inboard end of sliding member 123 by a bolt 127, and is attached at its outboard end to the inboard end of pin 59 by a bolt 128.

Figure 5A:
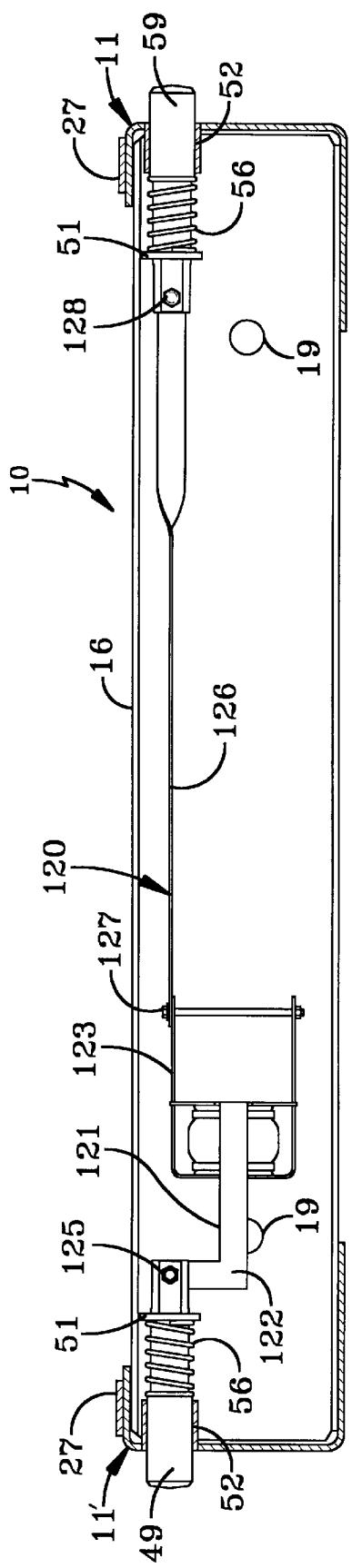
FIG. 5A is a front view of the slider and second embodiment locking pin mechanism of FIG. 4, showing the pins in an extended or locked position.
Figure 5B:
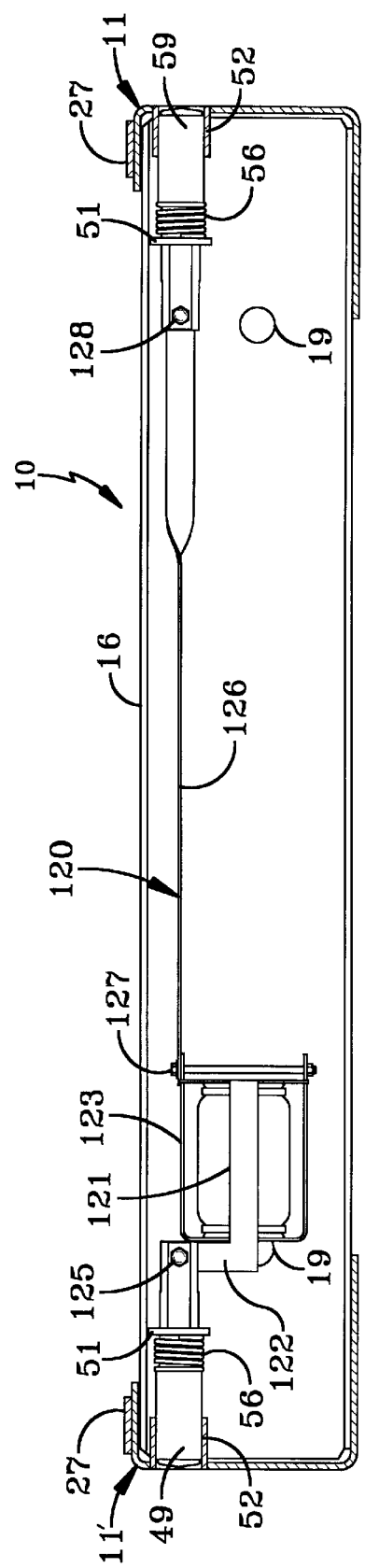
FIG. 5B is a view similar to FIG. 5A, but showing the pins in a retracted or unlocked position.

Second embodiment locking pin mechanism 120 of the present invention operates as follows. As best shown in FIGS. 4 and 5A, when air is exhausted from actuator 124, the actuator moves to its normal or collapsed position. It is understood that air is introduced into and exhausted from actuator 124 in the same manner as described hereinabove for first embodiment locking pin mechanism 100. This movement causes sliding member 123 to move in the direction of pin 59, which in turn causes extension arm 126 to move in the same direction, which in turn provides enough transverse slack in the mechanism to enable the bias of spring 56 to automatically push pin 59 outboardly through its respective opening formed in main member 11 and into a selected aligned one of the openings formed in the trailer frame rail, to lock slider 10 in a selected longitudinal position relative to the trailer main frame. Similarly, the collapsing of air spring 124 causes base member 122 to move together with pin 49 in an outboard direction as spring 56 causes the pin to move through its respective opening formed in main member 11' and into a selected aligned one of the openings of the trailer frame rail disposed adjacent to main member 11', for locking the slider in its selected location. When it is desired to selectively reposition slider 10 with respect to the trailer main frame, the valve is opened by the operator of the semi-trailer causing air to flow into actuator 124, thereby elongating the actuator in a transverse direction, as shown in FIG. 5B. The elongation of air actuator 124 causes sliding member 123 to move in a direction away from pin 59 together with extension arm 126, thereby overcoming the bias force of spring 56 and linearly retracting the pin from the trailer frame rail opening to an unlocked position. Similarly, the elongation of air actuator 124 causes base member 122 to move together with pin 49 in a direction away from main member 11', thereby overcoming the bias force of coil spring 56 and linearly retracting pin 49 from the selected trailer frame rail opening. Slider 10 then can be longitudinally repositioned with respect to the trailer main frame. After slider 10 has been selectively repositioned, the valve then is closed and air is exhausted from actuator 124, and pins 49, 59 extend to the locked position shown in FIGS. 4 and 5A due to the increased transverse length of cage 121 and the outboard bias force of coil springs 56. As discussed hereinabove with respect to first embodiment 100 of the present invention, each pin 49, 59 is independently extendable to the locked position or retractable to the unlocked position by second embodiment locking mechanism 120 of the present invention. As with first embodiment locking pin mechanism 100, second embodiment locking mechanism 120 also can be used to automatically free jammed pins, and also could be hydraulically, electrically or even manually actuated. Moreover, locking pin mechanism 120 also requires little or no adjustment or timing, and is relatively tolerance insensitive provided the travel of actuator 124 is long enough to retract and extend pins 49, 59.

In accordance with one of the main advantages of second embodiment 120 of the present invention, slider 10 is free of having to bear reactive forces caused by normal operation of locking pin mechanism 120, other than those imposed on brackets 51 by coil springs 56 or on the opposite bracket 51 by a jammed pin 49, 59. More particularly, the reactive forces caused by normal operation of locking mechanism 120, and in particular by movement of each pin 49, 59 of the mechanism, bear on the opposite pin rather than slider 10. Thus, slider 10 is free of special structure and/or reinforcement designed to bear such reactive forces.

Figure 7:
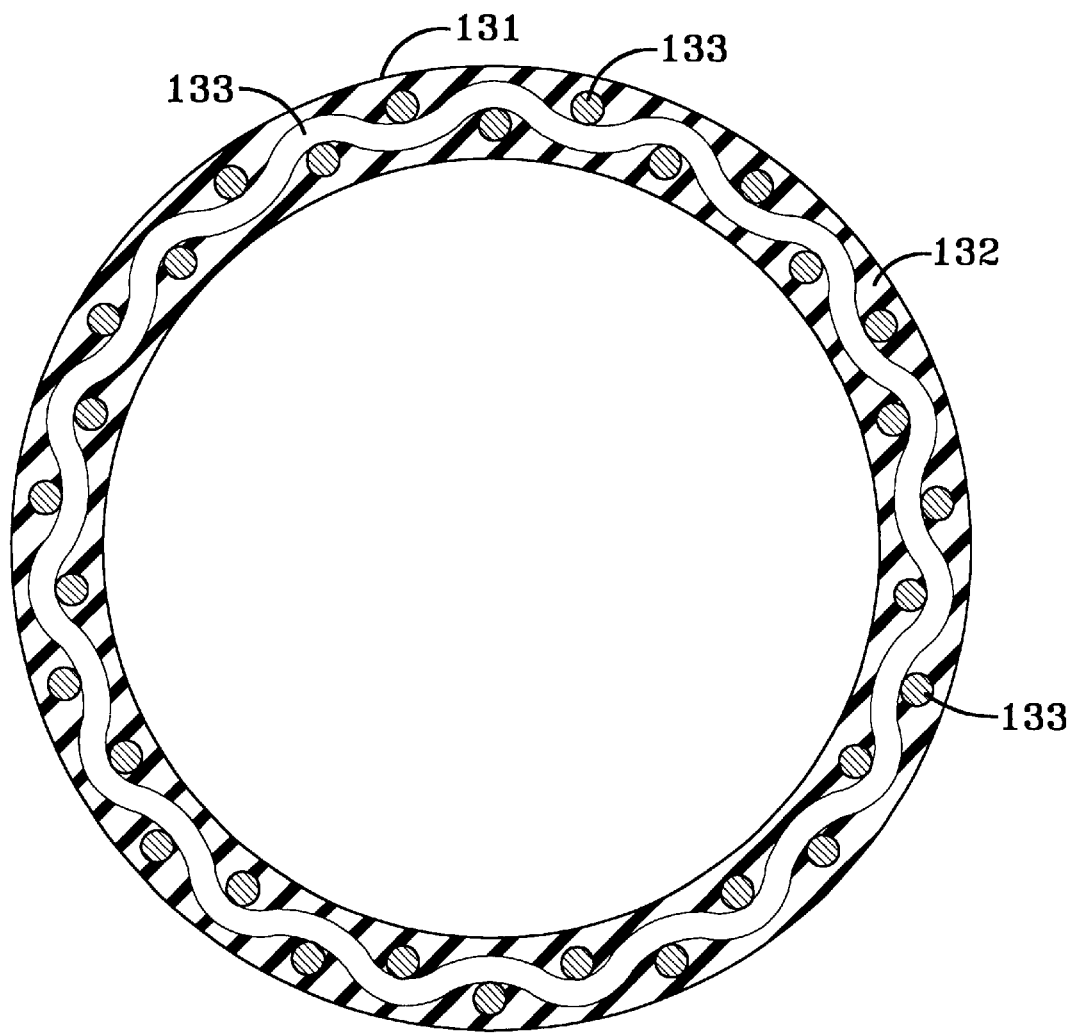
FIG. 7 is a sectional view of the bladder of the third embodiment locking, pin mechanism, taken along lines 7—7 of FIG. 6.

A third embodiment of the locking pin mechanism of the present invention is indicated generally at 130 and is shown in FIGS. 6A and 6B. As with first and second embodiments 100, 120, respectively, of the present invention, third embodiment locking pin mechanism 130 only is capable of controlling two locking pins, and thus is shown controlling front pins 49, 59, with a separate mechanism 130 independently controlling rear locking pins 69, 79. Since both mechanisms 130 are identical in structure and operation, only the front locking pin mechanism will be described hereinbelow. An elongated bladder 131 is mounted transversely between pins 49, 59. As best shown in FIG. 7, bladder 131 is of the type commonly used in vehicle bias ply tire constructions. More specifically, bladder 131 is formed of any suitable elastomeric material 132 having cords 133 embedded therein in a bias type arrangement well known to those skilled in the art. Cords 133 are formed of any suitable material such as plastic or fiber. Bladder 131 communicates with the air reservoir of the semi-trailer brake system through a conduit (not shown). The effect of this bias ply construction will be described below in the description of the operation of third embodiment locking pin mechanism 130. Each end of bladder 131 is attached by suitable means to a non-elastic elongated attachment member 134 which is formed of any suitable durable material such as nylon or the like. An attachment ring 135 preferably is attached to the outboard end of each attachment member 134 by looping the attachment member about the ring. Each ring 135 in turn is attached to the inboard end of its respective pin 49, 59 by capturing the ring in a recess (not shown) formed in the inboard end of the pin with a bolt 136. It should be noted that other means of attachment of bladder 131 to pins 49, 59 could be utilized without affecting the concept of the third embodiment of the present invention, such as by making attachment member 134 and ring 135 an integral one-piece member.

Third embodiment locking pin mechanism 130 of the present invention operates as follows. As shown in FIG. 6A, when air is exhausted from bladder 131, the bladder is in its normal or collapsed state. It is understood that air is introduced into and exhausted from bladder 131 in the same manner as described in detail hereinabove for first embodiment locking pin mechanism 100. The effective transverse length of bladder 131, attachment members 134 and rings 135 is greatest when the bladder is in the collapsed state, and so provides slack for coil springs 56 of pins 49, 59 to automatically bias the pins outboardly and through their respective openings in main members 11, 11', and into the selected aligned openings formed in the trailer frame rails to lock slider 10 in a selected longitudinal position relative to the trailer main frame. When it is desired by the operator of the semi-trailer to reposition slider 10 relative to the trailer main frame, the valve is opened and air from the reservoir fills bladder 131. Due to the bias weave of cords 133 embedded in elastomeric material 132, as bladder 131 fills with air, the bladder distends and its diameter increases, but the transverse length of the bladder shortens to impart a linear pulling or retraction force on pins 49, 59 (FIG. 6B). This retraction force overcomes the bias force of springs 56 and retracts each pin 49, 59 from its respective aligned trailer frame rail opening, to enable the slider to be selectively longitudinally repositioned beneath the trailer main frame. When the position of slider 10 relative to the trailer main frame has been selected, the valve then is closed and air is exhausted from bladder 131, thereby adding transverse slack to bladder 131, and in turn enabling pins 49, 59 to move to a locked position as shown in FIG. 6A due to the outboard bias of coil springs 56. As with first and second locking pin mechanism embodiments 100, 120, respectively, each pin, 49, 59 is independently extendable to the locked position or retractable to the unlocked position by third embodiment locking pin mechanism 130. As before, third embodiment locking pin mechanism 130 also can be utilized to free jammed pins from the locked position, and it is contemplated that it also could be hydraulically, electrically or even manually actuated. Moreover, locking pin mechanism 130 also requires little or no adjustment or timing, and is relatively tolerance insensitive so long as the transverse travel of bladder 131 is long enough to retract and extend pins 49, 59.

In accordance with a key feature of third embodiment 130 of the present invention, slider 10 is free of having to bear reactive forces caused by normal operation of locking pin mechanism 130, other than those imposed on brackets 51 by coil springs 56 or on the opposite bracket 51 by a jammed pin 49, 59. As with second embodiment 120, the reactive forces caused by normal operation of locking pin mechanism 130, and in particular by movement of each pin 49, 59 of the mechanism, bear on the opposite pin rather than slider 10. Thus, slider 10 is free of special structure and/or reinforcement designed to bear such reactive forces.

Figure 9:
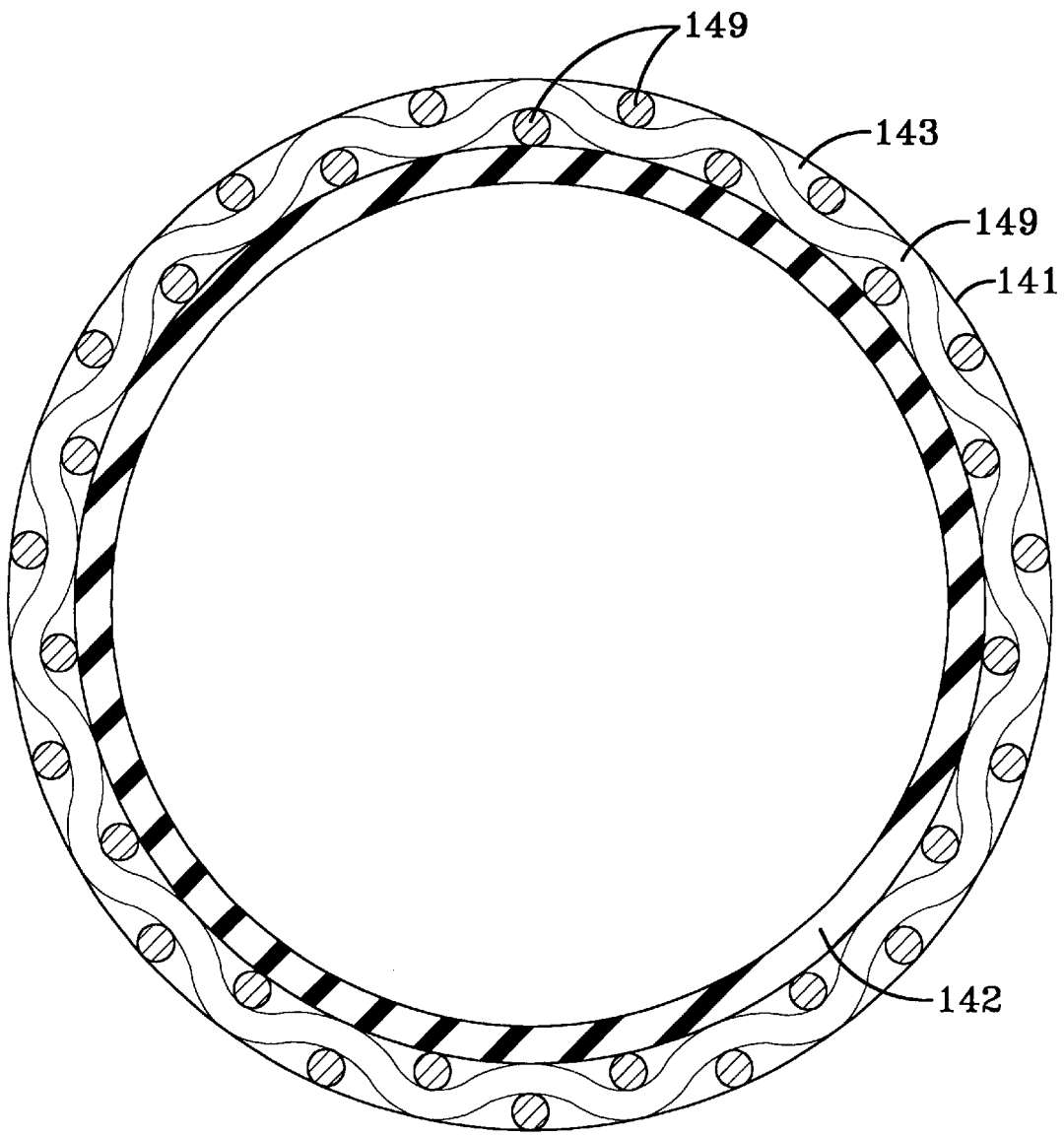
FIG. 9 is a sectional view of the bladder of the fourth embodiment locking pin mechanism, taken along lines 9—9 of FIG. 8B.

A fourth embodiment of the locking pin mechanism of the present invention is indicated generally at 140 and is shown in FIGS. 8A and 8B. As with first, second and third embodiment locking pin mechanisms 100, 120, 130, respectively, of the present invention, fourth embodiment locking pin mechanism 140 only can independently control two locking pins and thus is shown controlling front pins 49, 59, and it is understood that a separate mechanism 140 independently controls rear pins 69, 79. Therefore, since both mechanisms 140 are identical in construction and function, only the front locking pin mechanism will now be described. An elongated bladder 141 is mounted transversely between pins 49, 59. As best shown in FIG. 9, bladder 141 comprises an inner tube 142 formed of any suitable elastomeric material such as synthetic rubber or the like, and an outer sheath 143 comprised of cords or strands 149 formed of metal, fiber, nylon, orlon and the like, effective lengths of which are disposed at acute angles with respect to lines on the surface of the sheath drawn parallel to the longitudinal axis thereof, all interwoven to form a braid or net-like bias sheath. Inner tube 142 communicates with the air reservoir of the semi-trailer brake system through a conduit (not shown). The affect of this construction of bladder 141 will be described below in the description of the operation of fourth embodiment locking pin mechanism 140. Each end of bladder 141 is attached by suitable means to a non-elastic elongated attachment member 144, which is formed of any suitable durable material such as nylon or the like. An attachment ring 145 is attached to the outboard end of each attachment member 144 by looping the attachment member about the ring. Each ring 145 in turn is attached to the inboard end of its respective pin 49, 59 by capturing the ring in a recess (not shown) formed in the inboard end of the pin with a bolt 146. As with third embodiment locking pin mechanism 130 of the present invention, other means of attachment of bladder 141 to pins 49, 59 can be utilized without affecting the concept of the fourth embodiment of the present invention.

The operation of fourth embodiment locking pin mechanism 140 of the present invention now can be described. As shown in FIG. 8A, when air is exhausted from bladder 141, the bladder is in its normal or collapsed state. It is understood that air is introduced into and exhausted from bladder 141 in the same manner as described in detail hereinabove for first embodiment locking pin mechanism 100. The effective transverse length of bladder 141, attachment members 144 and rings 145 is greatest when the bladder is in the collapsed state, and thus provides slack for coil springs 56 of pins 49, 59 to automatically bias the pins outboardly and through their respective openings in main members 11, 11', and into the selected aligned openings formed in the trailer frame rails, to lock slider 10 in a selected longitudinal position relative to the trailer main frame. When it is desired by the operator of the semi-trailer to selectively reposition slider 10 with respect to the trailer main frame, the valve is opened and air from the reservoir fills bladder 141. Due to the bias weave of outer sheath 143, as bladder 141 fills with air, the bladder distends and its diameter increases, but the transverse length of the bladder and sheath both shorten to impart a linear pulling or retraction force on pins 49, 59 (FIG. 8B). This retraction force overcomes the bias force of springs 56 and retracts each pin 49, 59 from its respective trailer frame rail opening, to enable the slider to be selectively longitudinally repositioned beneath the trailer main frame. When the position of slider 10 relative to the trailer main frame has been selected, the valve then is closed and air is exhausted from bladder 141, thereby adding transverse slack to the bladder, and in turn enabling pins 49, 59 to move to a locked position as shown in FIG. 8A due to the outboard bias of coil springs 56. As with first, second and third locking pin mechanism embodiments 100, 120, 130, respectively, each pin 49, 59 is independently extendable to the locked position or rectractable to the unlocked position by fourth embodiment pin locking mechanism 140. As with the other embodiments, fourth embodiment locking pin mechanism 140 also can be utilized to free jammed pins to an unlocked position, and it is also contemplated that the mechanism could be hydraulically, electrically or even manually actuated. In addition, locking pin mechanism 140 also requires little or no adjustment or timing, and is generally tolerance insensitive so long as the transverse travel of bladder 141 is long enough to retract and extend pins 49, 59.

In accordance with a key feature of fourth embodiment 140 of the present invention, slider 10 is free from reactive forces caused by normal operation of locking pin mechanism 140, other than those imposed on brackets 51 by coil springs 56 or on the opposite bracket 51 by a jammed pin 49, 59. As with second and third embodiments 120, 130, respectively, the reactive forces caused by normal operation of locking mechanism 140, and in particular by movement of each pin 49, 59 of the mechanism, bear on the opposite pin rather than on structural components of slider 10. Thus, slider 10 is free of special structure and/or reinforcement designed to bear such reactive forces.

Figure 10A:
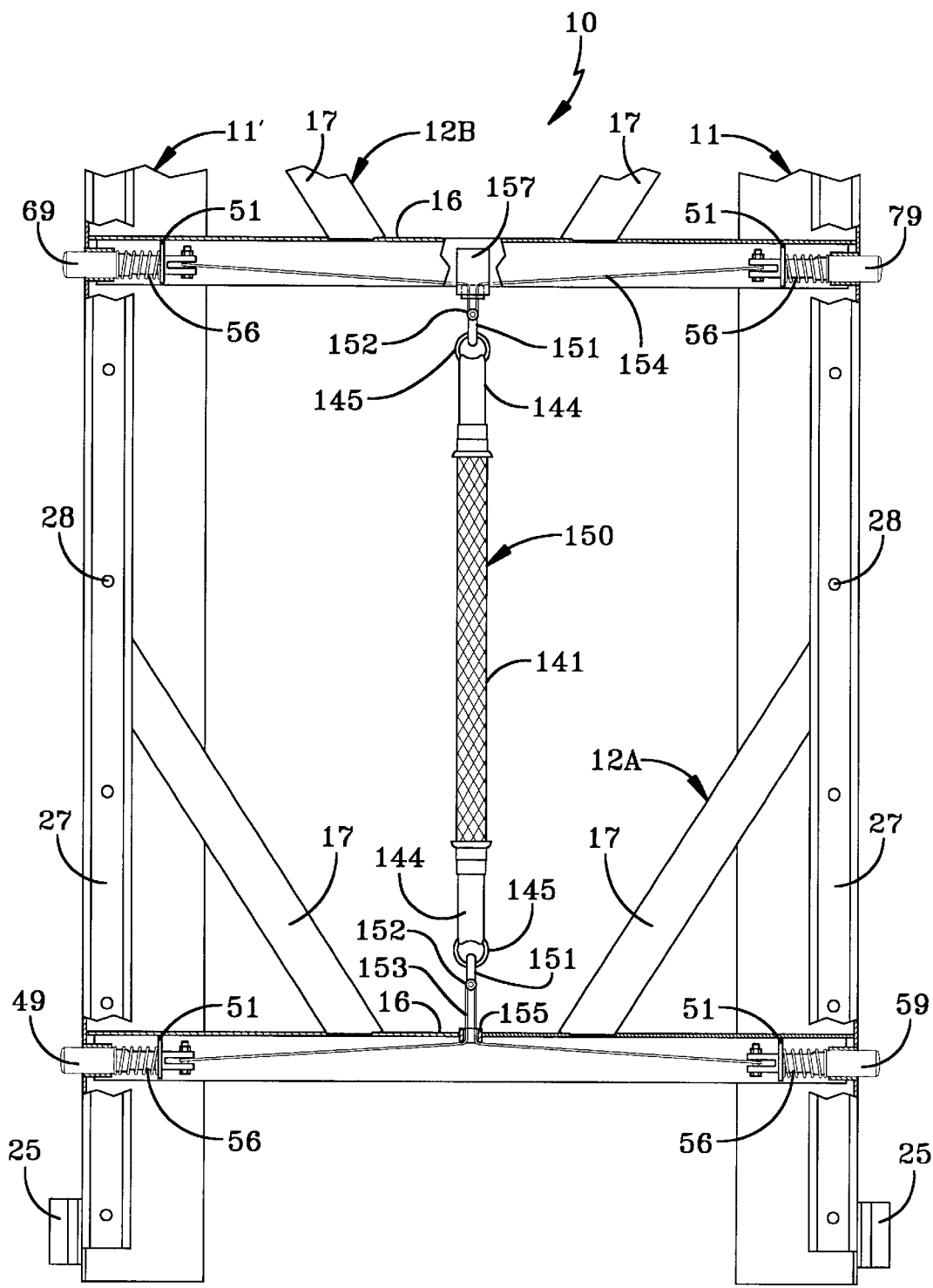
FIG. 10A is a fragmentary top plan view, with portions broken away and in section and hidden parts represented by broken lines, of a semi-trailer slider, showing a fifth embodiment of the locking pin mechanism of the present invention installed on the slider, and further showing the pins in an extended or locked position.
Figure 10B:
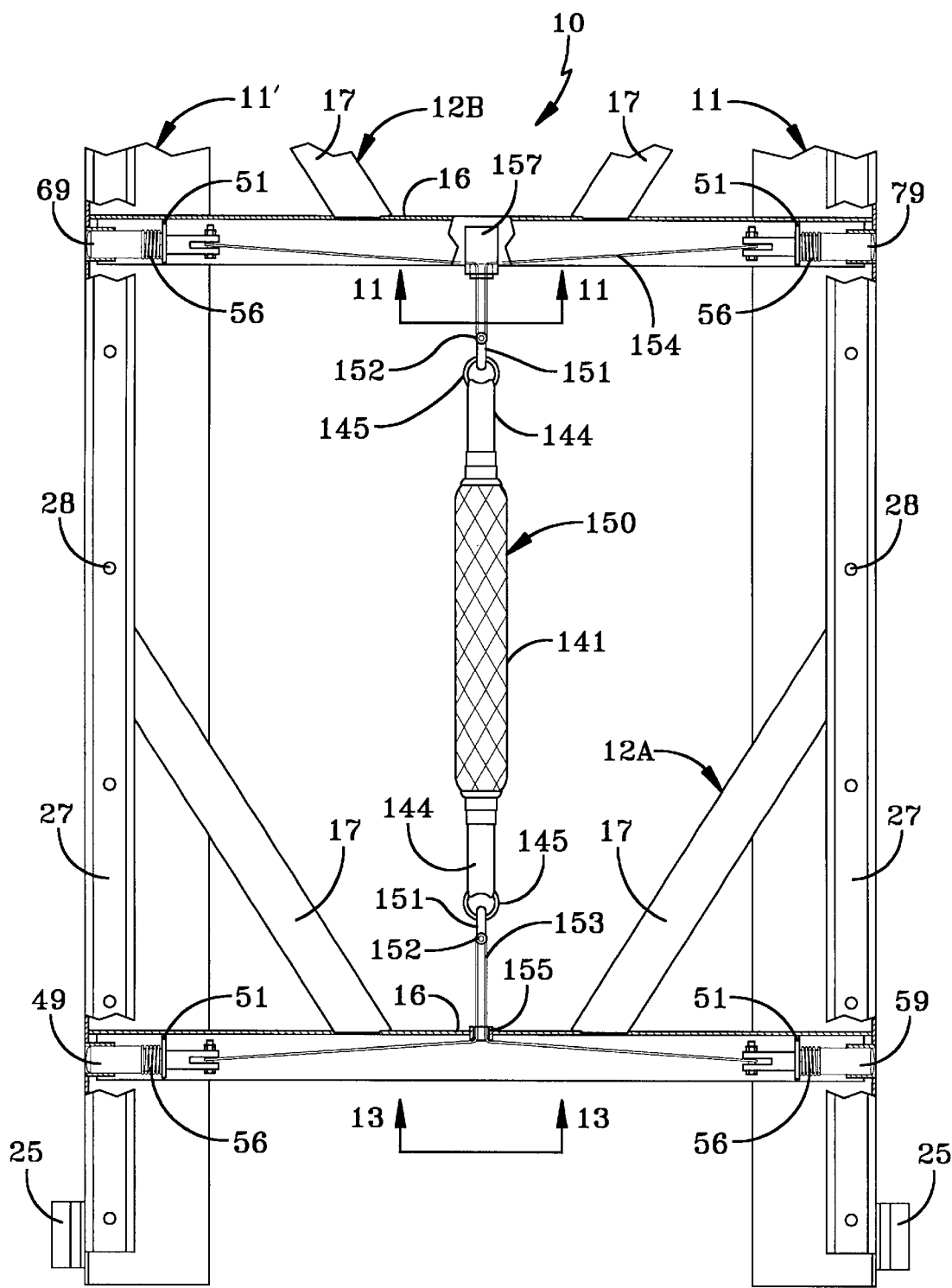
FIG. 10B is a view similar to FIG. 10A, but showing the pins in a retracted or unlocked position.
Figure 11:
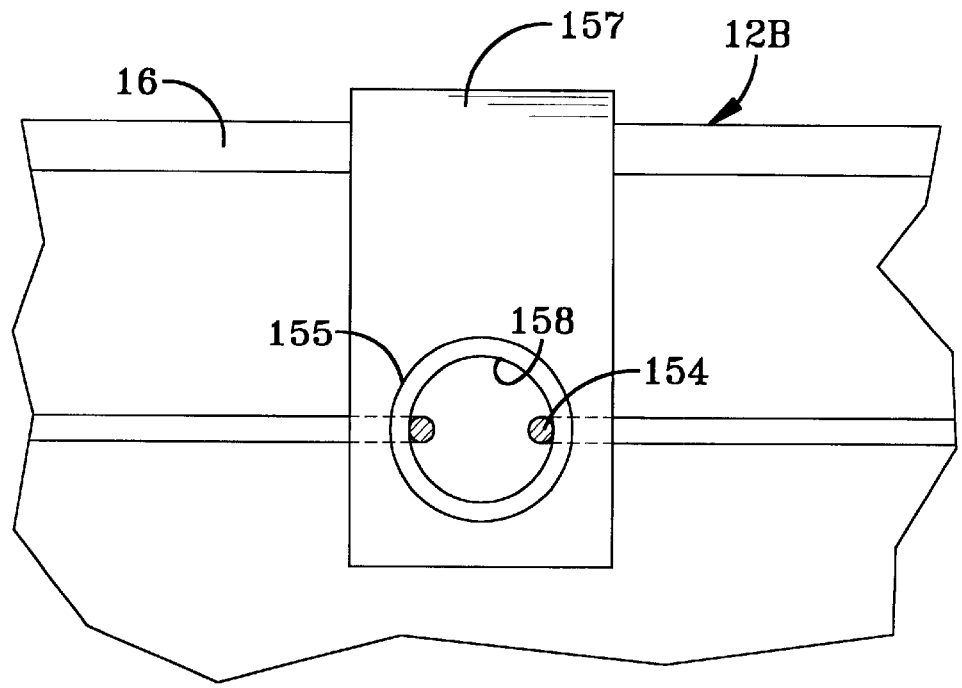
FIG. 11 is a greatly enlarged fragmentary view looking in the direction of lines 11—11 of FIG. 10B, with portions in section and hidden parts represented by broken lines, of a rear cable guide bracket and guide tube of the fifth embodiment locking pin mechanism.
Figure 12:
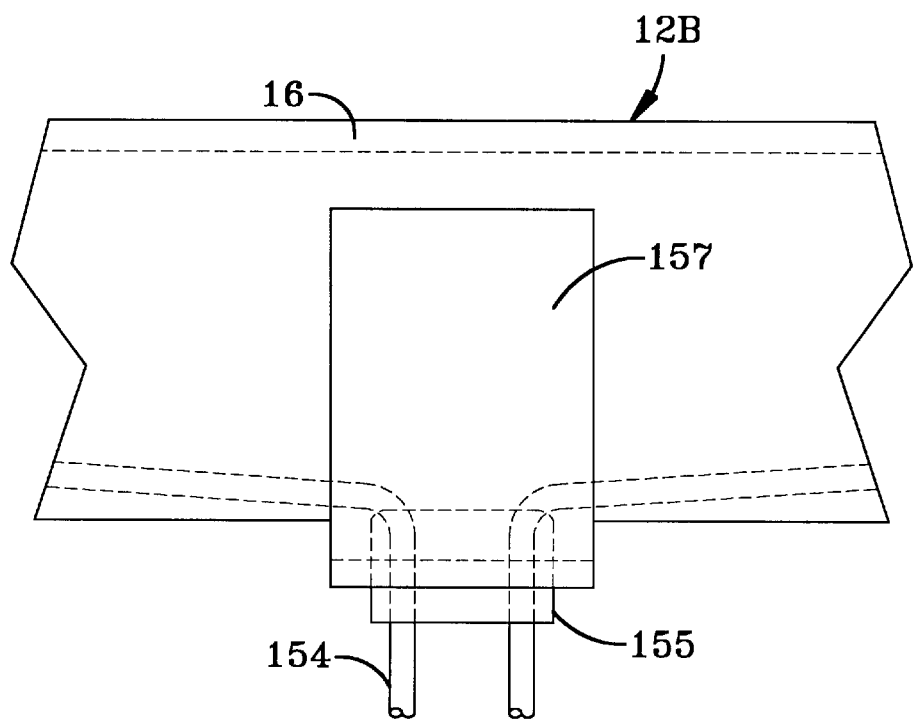
FIG. 12 is a top view of the rear cable guide bracket and guide tube shown in FIG. 11.
Figure 13:
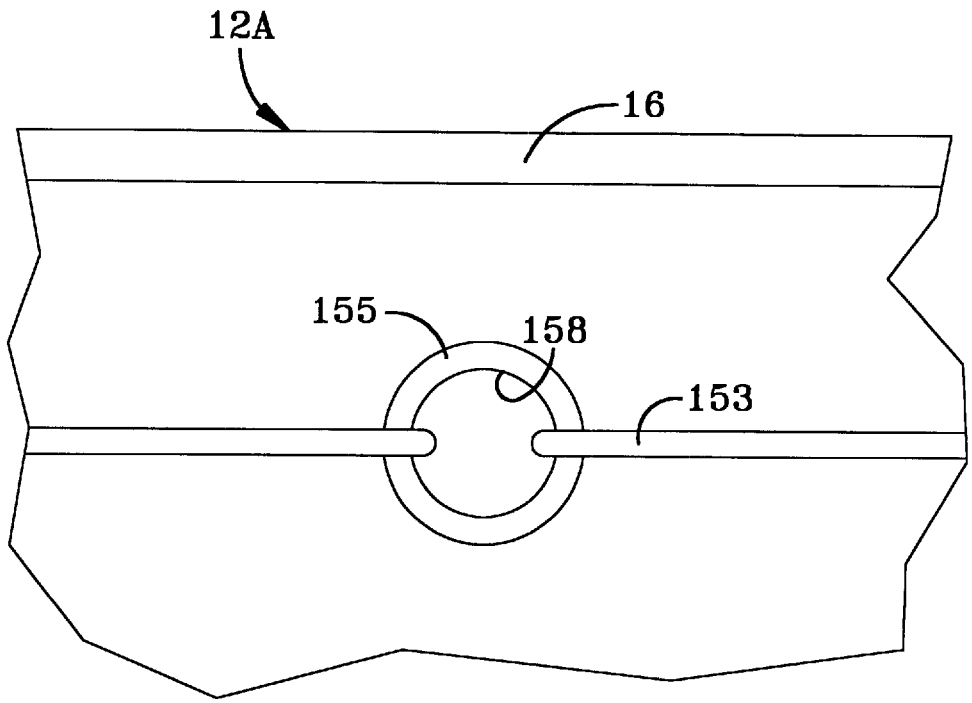
FIG. 13 is a greatly enlarged fragmentary view looking in the direction of lines 13—13 of FIG. 10B, of a front cable guide tube of the locking pin mechanism.
Figure 14:
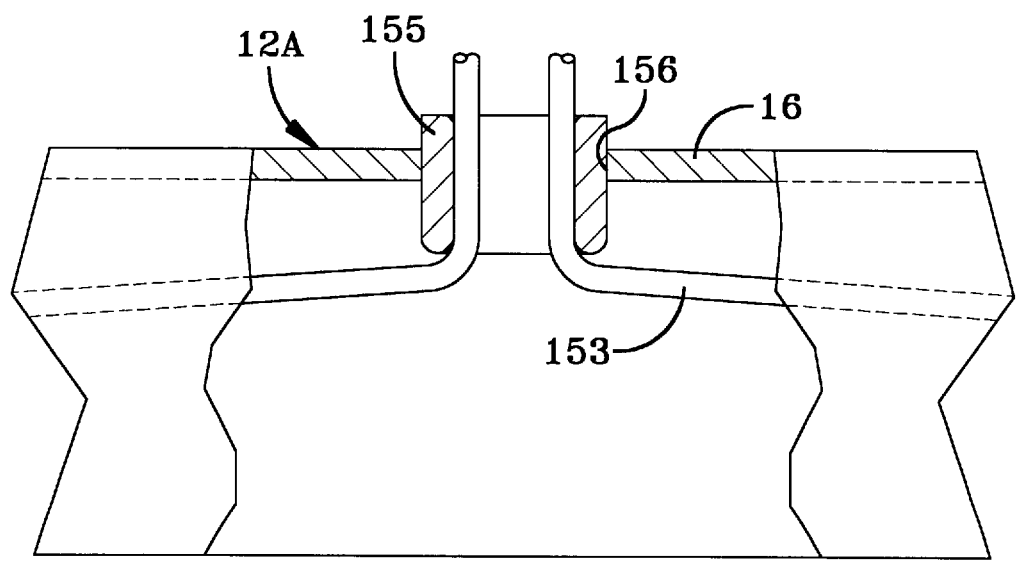
FIG. 14 is a top view of the cable guide tube shown in FIG. 13, with portions broken away and in section and hidden parts represented by broken lines. Similar numerals refer to similar parts throughout the drawings.

A fifth embodiment of the locking pin mechanism of the present invention is indicated generally at 150 and is shown in FIGS. 10A and 10B. Unlike first, second, third, and fourth embodiment locking pin mechanisms 100, 120, 130, and 140, respectively, of the present invention, fifth embodiment locking pin mechanism 150 can independently control all four locking pins 49, 59, 69, and 79 conventionally found on a semi-trailer slider 10. Elongated bladder 141 described hereinabove and used in fourth embodiment locking pin mechanism 140, is used in fifth embodiment locking pin mechanism, but it is understood that bladder 131 described hereinabove and used in third embodiment locking pin mechanism 130 could also be successfully employed. Each end of bladder 141 is attached by suitable means to non-elastic elongated attachment member 144. Attachment ring 145 in turn is attached to the outboard end of each attachment member 144 by looping the attachment member about the ring. A bracket 151 in turn is attached about ring 145 at one of its ends and preferably fixedly captures a vertically extending capstan 152 at the other of its ends. As with third and fourth embodiments 130, 140, respectively, of the present invention, other means of attachment of bladder 141 to brackets 151 can be employed without affecting the overall concept of fifth embodiment 150 of the present invention. A front cable 153, formed of any suitable material such as aircraft cable, is attached at each of its ends to the inboard end of a respective one of pins 49, 59 in a usual manner, and extends between the pins and about front capstan 152. As best shown in FIGS. 13 and 14, front cable 153 is maintained in operative alignment with pins 49, 59 and capstan 152 by a guide tube 155. More specifically, guide tube 155 is formed with an opening 158 and is fitted within a corresponding-sized opening 156 formed in the vertical web of base member 16 of front K-shaped cross member structure 12A, and is secured therein by welds or the like. Similarly, a rear cable 154, formed of the same material as front cable 153, is attached at each of its ends to the inboard end of a respective one of pins 69, 79 in a usual manner, and extends between the pins and about rear capstan 152. As best shown in FIGS. 11 and 12, rear cable 154 is maintained in operative alignment with pins 69, 79 and rear capstan 152 by a guide bracket 157. More specifically, guide bracket 157 is formed with an opening (not shown) in which a rear guide tube 155 is fitted and secured such as by welding. Rear guide tube 155 in turn is formed with an opening 158 for passage of rear cable 154. The assembly of rear guide tube 155 and guide bracket 157 is mounted on the top surface of base member 16 of rear K-shaped cross member structure 12B by any suitable means, and depends therefrom.

Fifth embodiment locking pin mechanism 150 of the present invention operates in the following manner. As shown in FIG. 10A, when air is exhausted from bladder 141, the bladder is in its normal or collapsed state. It is understood that air is introduced into and exhausted from bladder 141 in the same manner as described in detail hereinabove for first embodiment locking pin mechanism 100. The effective transverse length of each of front and rear cables 153, 154, respectively, is greater when bladder 141 is in the collapsed state, and thus provides slack for coil springs 56 of pins 49, 59, 69, and 79 to automatically bias the pins outboardly and through their respective openings in main members 11, 11' and into the selected aligned openings formed in the trailer frame rails to lock slider 10 in a selected longitudinal position relative to the trailer main frame. When it is desired by the operator of the semi-trailer to selectively reposition slider 10 relative to the trailer main frame, the valve is opened and air from the reservoir fills bladder 141. Due to the bias weave of outer sheath 143, as bladder 141 fills with air, the bladder distends and its diameter increases, but the longitudinal length of the bladder and sheath both shorten, which in turn causes front and rear cables 153, 154, respectively, to shorten transversely due to pulling of the cables in a longitudinal direction toward the center of slider 10, to impart a linear pulling or retraction force on pins 49, 59, 69 and 79 (FIG. 10B). This retraction force overcomes the bias force of springs 56 and retracts each pin 49, 59, 69, and 79 from its respective trailer frame rail opening to enable the slider to be selectively longitudinally repositioned beneath the trailer main frame. When the position of slider 10 relative to the trailer main frame has been selected, the valve then is closed and air is exhausted from bladder 141, thereby adding longitudinal slack to the bladder and transverse slack to each of cables 153, 154, to in turn enable pins 49, 59, 69, and 79 to move to a locked position as shown in FIG. 10A due to the outboard bias of coil springs 56. Thus, each of the four pins 49, 59, 69, and 79 is independently extendable to the locked position and retractable to the unlocked position by fifth embodiment pin locking mechanism 150. Fifth embodiment locking pin mechanism also can be utilized to automatically free jammed pins, and it is further contemplated that this mechanism also could be hydraulically, electrically or even manually actuated. In addition, locking pin mechanism 150 also requires little or no adjustment or timing, and generally is tolerance insensitive provided the longitudinal travel of bladder 141 is long enough to retract and extend pins 49, 59, 69, 79.

In accordance with an important feature of fifth embodiment 150 of the present invention, slider 10 is relatively free from reactive forces caused by normal operation of locking pin mechanism 150, other than those forces imposed on brackets 51 by coil springs 56 or on the opposite bracket 51 by a jammed pin 49, 59 or 69, 79. More specifically, due to the longitudinal disposition of bladder 141, cable 153 must pass through base member 16 of front K-shaped cross member 12A, and in particular through opening 158 of front guide tube 155 which is mounted in opening 156 formed in the base member. This enables cable 153 to be oriented in generally transverse alignment with pins 49, 59 for applying a linear retraction force to the pins. Of course, due to this arrangement of parts, a certain amount of reactive force will translate from cable 153, through guide tube 155 and into base member 16. Similarly, the assembly of rear guide tube 155 and guide bracket 157 must be mounted on base member 16 of rear K-shaped cross member 12B, to transversely orient cable 154 with respect to pins 69, 79. Again, a certain amount of reactive force will translate from cable 154, through rear guide tube 155, through guide bracket 157, and into rear base member 16. However, it is understood that this bearing of reactive forces on front and rear base members 16 is due to the arrangement of parts of fifth embodiment locking pin mechanism 150, rather than a need to absorb reactive forces from the mechanism into slider 10. As with second, third and fourth embodiments 120, 130, and 140, respectively, the reactive forces caused by normal operation of locking mechanism 150, and in particular by movement of each pair of pins 49, 59 and 69, 79, substantially bear on the opposite pin of the pair rather than on structural components of slider 10. Thus, slider 10 is free of special structure and/or reinforcement designed to bear such reactive forces.

Thus, it can be seen that all five embodiments of the pin retraction mechanism of the present invention display advantages over manual, stored-energy, fluid, and electrically controlled prior art locking pin mechanisms. With respect to fluid or electrically controlled locking pin mechanisms wherein each pin is individually controlled by its own actuator, it can be seen that the present invention utilizes a single actuator to control two or even four pins, while still maintaining the ability of each pin to move to an extended locked position or a retracted unlocked position independently of the other pins. Such prior art systems are less desirable than the present invention because they are more expensive, heavier and less reliable. With respect to prior art manual, stored-energy, fluid, or electrically controlled systems such as shown in FIG. 1, the present invention again has a marked advantage. More particularly, the embodiments of the present invention clearly lack the complicated linkages which add to the overall weight of the slider and which are subject to increased maintenance and/or downtime and are relatively high in cost. Moreover, in such prior linkage systems, each of the pins can only lock and unlock simultaneously with all of the other pins, which can be undesirable as discussed hereinabove. In contrast, the present invention enables each pin to act independently. Finally, the present invention generally is free of the requirement that the slider act as a bearing surface against reactive forces produced during normal operation of the locking pin mechanism. The embodiments of the present invention all are free of reinforced structure and/or added structure designed to counteract such forces. The present invention locking pin mechanisms, unlike many prior art[]mechanisms, are insensitive to tolerances and require little or no timing and adjustment, and in fact are self-adjusting and aligning, which also contributes to the relatively simple, lightweight and cost effective mechanism embodiments of the present invention.

It is understood that the present invention contemplates many modifications to the disclosed embodiments, without affecting their overall concept. First, air actuator 101 of first embodiment 100 could be replaced with a transversely disposed bladder such as bladder 131 or 141 useful in third, fourth and fifth embodiments 130, 140 and 150, respectively, of the present invention. A cable could be attached to each of the ends of the bladder, and extend between its respective bladder end and its respective pin. Also, other types of devices which elongate and collapse like air actuators 101 and 124 of first and second embodiments 100 and 120, respectively, such as a piston, could be utilized. Moreover, cables 106, 153 and 154 of first and fifth embodiments 100 and 150, respectively, could be effectively replaced with other flexible elongated members, such as a chain, a rope or a flat steel member. Finally, the present invention contemplates that air actuators 101, 124 and bladders 131, 141 could be covered with a shroud formed of any durable material to protect the actuator or bladder from damage.

Accordingly, the improved locking mechanism for a movable subframe of a semi-trailer is simplified, provides an effective, safe, inexpensive, and efficient device which achieves all the enumerated objectives, eliminates difficulties encountered with prior locking mechanisms, solves existing problems, and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the locking mechanism for a movable subframe of a semi-trailer is constructed, arranged and used, the characteristics of the construction and arrangement, and the advantageous, new and useful results obtained; the new and useful structures, devices, elements, arrangements, parts and combinations, are set forth in the appended claims.

What is claimed is:

1. A locking mechanism for a movable subframe of a vehicle, said mechanism including:

a) at least a pair of transversely spaced locking pins movably mounted on said subframe, each of said locking pins being mounted adjacent to an opening formed in a respective one of a pair of spaced apart, longitudinally extending main members of the subframe; and b) a linkage operatively connected to said locking pins, said linkage including an inflatable member disposed inboardly of said locking pins, said linkage further including at least one link operatively connected to and extending inboardly from said locking pins, said link further being connected to said inflatable member, so that upon inflation of said inflatable member, a transverse length of the linkage is shortened and opposed retraction forces are imparted on said pins to enable each of the pins to overcome an outboard bias force of a spring disposed about said pin, thereby independently retracting each of the pins from a selected aligned one of a plurality of openings formed in a respective one of a pair of spaced apart, longitudinally extending rails of a main frame of said vehicle, to enable longitudinal repositioning of the subframe beneath said vehicle main frame, said inflatable member upon deflation further enabling lengthening of said transverse length of said linkage so that said bias force of each of said springs independently urges its respective pin outboardly through said aligned openings to lock said subframe relative to the main frame.

2. The locking mechanism of claim 1, in which said inflatable member for shortening said transverse length of said linkage is an elastic bladder; in which said elastic bladder communicates with an air reservoir of said vehicle; and in which said spring is a coil spring.

3. The locking mechanism of claim 2, in which said elastic bladder elongates when air is introduced into the bladder from said air reservoir.

4. The locking mechanism of claim 2, in which said elastic bladder distends and shortens when air is introduced into the bladder from said air reservoir.

5. The locking mechanism of claim 3, in which said bladder is disposed longitudinally on said subframe; in which said link is a cable extending transversely between said pins and is connected at each of its ends to a respective one of the pins; and in which said cable is operatively connected to the bladder, so that upon introduction of air into said bladder, the bladder elongates in a longitudinal direction and shortens the transverse length of the cable to retract each of said pins from its respective aligned openings, and further upon deflation of said bladder to a collapsed state said transverse length of said cable lengthens to enable said bias of each of said coil springs to urge its respective pin into its respective aligned openings.

6. The locking mechanism of claim 3, in which said bladder is disposed transversely between said pins; in which said link is a slidably engaged assembly extending transversely between said pins and is connected at each of its ends to a respective one of the pins; and in which said slidably engaged assembly is operatively connected to the bladder, so that upon introduction of air into said bladder, the bladder elongates in a transverse direction and shortens the transverse length of the slidably engaged assembly to retract each of said pins from its respective aligned openings, and further upon deflation of said bladder to a collapsed state said transverse length of said slidably engaged assembly lengthens to enable said bias of each of said coil springs to urge its respective pin into its respective aligned openings.

7. The locking mechanism of claim 4, in which said bladder is an elongated bias ply bladder; in which the bladder is disposed transversely between said pins; and in which each of the ends of said bladder is operatively connected to a respective one of the pins by a respective one of a pair of said links, said links each comprising a non-elastic attachment member, so that upon introduction of air into said bladder, said bladder distends and shortens the transverse length of the bladder and said attachment members to retract each of said pins from its respective aligned openings, and further upon deflation of said bladder to a normal elongated state said transverse length of the bladder and the attachment members lengthens to enable said bias of each of said coil springs to urge its respective pin into its respective aligned openings.

8. The locking mechanism of claim 4, in which said bladder is elongated and is encased within a bias ply sheath; in which said sheathed bladder is disposed transversely between said pins; and in which each one of the ends of the sheathed bladder is operatively connected to a respective one of the pins by a respective one of a pair of said links, said links each comprising a non-elastic attachment member, so that upon introduction of air into said sheathed bladder, the sheathed bladder distends and shortens the transverse length of said sheathed bladder and said attachment members to retract each of said pins from its respective aligned openings, and further upon deflation of the sheathed bladder to a normal elongated state said transverse length of said sheathed bladder and the attachment members lengthens to enable the bias of each of said coil springs to urge its respective pin into its respective aligned openings.

9. The locking mechanism of claim 4, in which said locking mechanism includes a front pair of transversely spaced locking pins and a rear pair of transversely spaced locking pins, said front pair of pins being longitudinally spaced from said rear pair of pins; in which said bladder is elongated and is disposed longitudinally and generally intermediate said pairs of pins; in which said link includes front and rear cables and front and rear non-elastic attachment members; in which said front cable extends between and is connected at each of its ends to a respective one of the front pair of pins and said rear cable extends between and is connected at each of its ends to a respective one of the rear pair of pins; in which said front attachment member is connected to a front end of the bladder and said rear is attachment member is connected to a rear end of said bladder; and in which said front cable is operatively connected to said front attachment member and said rear cable is operatively connected to said rear attachment member, so that upon introduction of air into the bladder, said bladder distends and shortens the longitudinal length of the bladder and each of the attachment members which in turn shortens the transverse length of each of the cables to retract each of said pins from its respective aligned openings, and further upon deflation of said bladder to a normal elongated state said longitudinal length of the bladder and the attachment members lengthens and the transverse length of each of said cables lengthens to enable said bias of each of said coil springs to urge its respective pin into its respective aligned openings.

10. The locking mechanism of claim 9, in which said bladder is a bias ply bladder.

11. The locking mechanism of claim 9, in which said bladder is encased in a bias ply sheath.

12. A locking mechanism for a movable subframe of a vehicle, said mechanism including:
 a) at least a pair of spaced-apart locking pins movably mounted on said subframe, each of said locking pins being mounted adjacent to a respective one of a pair of openings formed in the subframe; and
 b) a linkage operatively connected to the locking pins, said linkage including an inflatable member disposed inboardly of said locking pins, said linkage further including at least one link operatively connected to and extending inboardly from said locking pins, said link further being connected to said inflatable member, so that upon inflation of said inflatable member, the length of the linkage is shortened and opposed retraction forces are imparted on said pins to enable each of the pins to overcome an outboard bias force of a spring disposed adjacent to and acting on said pin, so that each of the pins can be independently retracted from a selected aligned one of a plurality of openings formed in a main frame of said vehicle, to enable repositioning of the subframe beneath said vehicle main frame, said inflatable member upon deflation further enabling an increase in the length of said linkage so that said bias force of each of said springs independently urges its respective pin outboardly through said aligned openings to lock said subframe relative to the main frame.

13. The locking mechanism of claim 12, in which the inflatable member for shortening said length of said linkage is an elastic bladder; and in which said elastic bladder communicates with an air reservoir of said vehicle.

14. The locking mechanism of claim 13, in which said elastic bladder elongates when air is introduced into the bladder from said air reservoir.

15. The locking mechanism of claim 13, in which said elastic bladder includes means for distending and shortening the bladder when air is introduced into said bladder from said air reservoir.

16. The locking mechanism of claim 14, in which said bladder is disposed on said subframe in a first direction; in which said link is a cable extending in a second direction between said pins and is connected at each of its ends to a respective one of the pins; and in which said cable is operatively connected to the bladder, so that upon introduction of air into said bladder, the bladder elongates in said first direction and shortens the length of the cable in said second direction to retract each of said pins from its respective aligned openings, and further upon deflation of said bladder to a collapsed state said cable lengthens in the second direction to enable said bias of each of said springs to urge its respective pin into its respective aligned openings.

17. The locking mechanism of claim 14, in which said bladder is disposed between said pins in a first direction, in which said link is a slidably engaged assembly extending between said pins in said first direction and is connected at each of its ends to a respective one of the pins; and in which said slidably engaged assembly is operatively connected to the bladder, so that upon introduction of air into said bladder, the bladder elongates in the first direction and shortens the length of the slidably engaged assembly to retract each of said pins from its respective aligned openings, and further upon deflation of said bladder to a collapsed state said slidably engaged assembly lengthens in said first direction to enable said bias of each of said springs to urge its respective pin into its respective aligned openings.

18. The locking mechanism of claim 15, in which said bladder is an elongated bias ply bladder; in which the bladder is disposed between said pins; and in which each one of the ends of said bladder is operatively connected to a respective one of the pins by a respective one of a pair of said links, said links each comprising a non-elastic attachment member, so that upon introduction of air into the bladder, said bladder distends and shortens the length of the bladder and attachment members to retract each of said pins from its respective aligned openings, and further upon deflation of said bladder to a normal elongated state said length of the bladder and the attachment members lengthens to enable said bias of each of said springs to urge its respective pin into its respective aligned openings.

19. The locking mechanism of claim 15, in which said bladder is elongated and is encased within a bias ply sheath; in which said sheathed bladder is disposed between said pins; and in which each one of the ends of the sheathed bladder is operatively connected to a respective one of the pins by a respective one of a pair of said links, said links each comprising a non-elastic attachment member, so that upon introduction of air into said sheathed bladder, the sheathed bladder distends and shortens the length of said sheathed bladder and said attachment members to retract each of said pins from its respective aligned openings, and further upon deflation of the sheathed bladder to a normal elongated state said length of said sheathed bladder and the attachment members lengthens to enable said bias of each of said springs to urge its respective pins into its respective aligned openings.

20. The locking mechanism of claim 15, in which said locking mechanism includes a first pair of locking pins spaced apart in a first direction and a second pair of locking pins spaced apart in said first direction, said first pair of pins being spaced from said second pair of pins in a second direction; in which said bladder is elongated and is disposed in said second direction and generally intermediate said pairs of pins; in which said link includes first and second cables and first and second non-elastic attachment members; in which said first cable extends between and is connected at each of its ends to a respective one of the first pair of pins and said second cable extends between and is connected at each of its ends to a respective one of the second pair of pins; in which said first attachment member is connected to a first end of the bladder and said second attachment member is connected to a second end of the bladder; and in which said first cable is operatively connected to said first attachment member and said second cable is operatively connected to said second attachment member, so that upon introduction of air into the bladder, said bladder distends and shortens the length of the bladder and each of the attachment members in said second direction which in turn shortens the length of each of the cables in said first direction to retract each of said pins from its respective aligned openings, and further upon deflation of said bladder to a normal elongated state said length of the bladder and the attachment members lengthens in the second direction and said length of each of said cables lengthens in said first direction to enable said bias of each of said springs to urge its respective pin into its respective aligned openings.

\* \* \* \* \*